(12) United States Patent
Stark

(10) Patent No.: US 6,850,845 B2
(45) Date of Patent: Feb. 1, 2005

(54) SYSTEM FOR MULTI-DIMENSIONAL DATA ANALYSIS

(76) Inventor: Tracy Joseph Stark, 5021 Sparrows Point, Plano, TX (US) 75023

(*) Notice: Subject to any disclaimer, the term of this patent is extended or adjusted under 35 U.S.C. 154(b) by 0 days.

(21) Appl. No.: 09/909,694

(22) Filed: Jul. 20, 2001

(65) Prior Publication Data

US 2003/0018436 A1 Jan. 23, 2003

(51) Int. Cl.$^7$ .............................................. G06F 19/00
(52) U.S. Cl. ....................................................... 702/16
(58) Field of Search ............................. 702/5, 16, 14; 703/10, 2; 367/69

(56) References Cited

U.S. PATENT DOCUMENTS

| | | |
|---|---|---|
| 4,464,569 A | 8/1984 | Flaum |
| 4,821,164 A * | 4/1989 | Swanson ..................... 702/16 |
| 5,056,066 A | 10/1991 | Howard |
| 5,153,858 A | 10/1992 | Hildebrand |
| 5,233,569 A | 8/1993 | Beasley et al. |
| 5,251,184 A | 10/1993 | Hildebrand et al. |
| 5,282,384 A | 2/1994 | Holbrook |
| 5,394,325 A | 2/1995 | Schneider, Jr. |
| 5,513,150 A | 4/1996 | Sicking et al. |
| 5,623,928 A | 4/1997 | Wright et al. |
| 5,724,309 A | 3/1998 | Higgs et al. |
| 5,838,634 A | 11/1998 | Jones et al. |
| 5,870,691 A | 2/1999 | Partyka et al. |
| 5,894,417 A | 4/1999 | Dorn |
| 5,963,508 A | 10/1999 | Withers |
| 5,966,672 A | 10/1999 | Knupp |
| 5,987,125 A | 11/1999 | Stringer et al. |
| 5,995,448 A | 11/1999 | Krehbiel |
| 5,995,907 A | 11/1999 | Van Bemmel et al. |
| 5,999,485 A | 12/1999 | Anstey et al. |
| 6,011,557 A | 1/2000 | Keskes et al. |
| 6,012,018 A | 1/2000 | Hornbuckle |
| 6,018,497 A | 1/2000 | Gunasekera |
| 6,018,498 A | 1/2000 | Neff et al. |
| 6,044,328 A | 3/2000 | Murphy et al. |
| 6,070,125 A | 5/2000 | Murphy et al. |
| 6,078,869 A | 6/2000 | Gunasekera |
| 6,092,026 A | 7/2000 | Bahorich et al. |
| 6,131,071 A | 10/2000 | Partyka et al. |
| 6,138,075 A | 10/2000 | Yost |
| 6,138,076 A | 10/2000 | Graf et al. |
| 6,150,973 A | 11/2000 | Pritt |
| 6,151,555 A | 11/2000 | Van Bemmel et al. |
| 6,201,884 B1 | 3/2001 | Van Bemmel et al. |
| 6,393,366 B1 | 5/2002 | Saggaf |

OTHER PUBLICATIONS

Hongliu Zeng and Stephen C. Henry and John P. Riola; "Stratal slicing, Part II: Real 3–D seismic data"; Geophysics; Mar.–Apr. 1998; p. 514–522; vol. 63; no. 2.

(List continued on next page.)

*Primary Examiner*—Donald E. McElheny, Jr.

(57) ABSTRACT

A first embodiment of the invention comprises a method for analyzing seismic data in which a seismic data volume, which includes seismic data sample points, is selected from a subsurface region of interest. A geologic time volume is declared having data storage locations corresponding to the seismic data sample points. Geologic times are obtained corresponding to the seismic data sample points, and the geologic times are stored in the geologic time volume in data storage locations corresponding to the seismic data sample points.

63 Claims, 14 Drawing Sheets

OTHER PUBLICATIONS

Hongliu Zeng and Stephen C. Henry and John P. Riola; "Stratal slicing, Part I: Realistic 3–D seismic model"; Geophysics; Mar.–Apr. 1998; p. 502–513; vol. 63; no. 2.

Jon Claerbout; Chapter 2: Model fitting by least squares; Geophysics Exploration Mapping; Feb. 27, 1998; p. 31–66; Stanford University.

Barbara J. Radovich and R. Burnet Oliveros; "3–D sequence interpretation of seismic instantaneous attributes from the Gorgon Field"; The Leading Edge; Sep. 1998; p. 1286–1293; 17; No. 9.

R. E. Sheriff and D. Frye and F. Koehler and M. T. Taner; "Extraction and Interpretation of the Complex Seismic Trace: Part II. Geologic Interpretation"; Geophysics; abstract from 1976 SEG meeting; p. 181; vol. 42; No. 1.

Umberto Spagnolini; "2–D phase unwrapping and phase aliasing"; Geophysics; Sep. 1993; p. 1324–1334; vol. 58; No. 9.

Tracy J. Stark; "Surface slice generation and interpretation: A review"; The Leading Edge; Jul. 1996; p. 818–819; 17; No. 7.

Brochure; VoxelGeo—A volume–based Visualization and Interpretation System; Paradigm Geophysical Ltd.; 1998.

Larry R. Beyer; "rapid 3–D screening with seismic terrain: deepwater Gulf of Mexico examples"; The Leading Edge; Apr. 2001; p. 386–395; 20; No. 4.

F. Koehler and M. T. Taner and R. E. Sheriff and D. Frye; "Extraction and Interpretation of the Complex Seismic Trace: Part I. Computational Procedures"; Geophysics; abstract from 1976 SEG meeting; p. 162; vol. 42; No. 1.

William A. Wescott and William N. Krebs and Paul J. Sikora and Paul J. Boucher and Jeffrey A. Stein; "Modern applications of biostratigraphy in exploration and production"; The Leading Edge; Sep. 1998; p. 1204–1210;17; No.9.

G. F. Carballo and P. W. Fieguth; "Multiresolution Network Flow Phase Unwrapping"; International Geoscience and Remote Sensing Symposium; 2000; 3 pages.

Geoffrey A. Dorn; "Modern 3–D seismic interpretation"; The Leading Edge; Sep. 1998; p. 1262–1272; 17; No.9.

Hongliu Zeng and Tucker F. Hentz and Lesli J. Wood; "Stratal slicing of Miocene–Pliocene sediments in Vermilion Block 50–Tiger Shoal Area, offshore Louisiana"; The Leading Edge; Apr. 2001; p. 408–418; 20; No.4.

P. R. Vail and R. M. Mitchum, Jr.; "Seismic Stratigraphy and Global Changes of Sea Level, Part 1: Overview"; Seismic Stratigraphy–applications to hydrocarbon exploration; AAPG Memoir 26; Dec. 1977; p. 51–52.

R. M. Mitchum, Jr. and P. R. Vail and S. Thompson, III; "Seismic Stratigraphy and Global Changes of Sea Level, Part 2: The Depositional Sequence as a Basic Unit for Stratigraphic Analysis"; Seismic Stratigraphy–applications to hydrocarbon exploration; AAPG Memoir 26; Dec. 1977; p. 53–62.

M. T. Taner and R. E. Sheriff; "Application of Amplitude, Frequency, and Other Attributes to Stratigraphic and Hydrocarbon Determination"; Seismic Stratigraphy—applications to hydrocarbon exploration; AAPG Memoir 26; Dec. 1977; p. 301–327.

Becky Leigh Wood; "Development of a Structural Framework from Seismic Reflection Data"; University of Texas Master's thesis; May 1988; p. i–xviii and p. 1–102.

E. Poggiagliolmi and A.J. Berkhout and M. M. Boone; "Phase Unwrapping, Possibilities and Limitations"; Geophysical Prospecting; 30 ;1982; p. 281–291. Reprinted in Seismic Source Signature Estimation and Measurement; Geophysics Reprint Series No.18; Society of Exploration Geophysicists; 1996; p. 250–260.

Toshifumi Matsuoka and Tad J. Ulrych; "Phase Estimation Using the Bispectrum"; Proceedings of the IEEE; 72; 1980; p. 1403–1411. Reprinted in Seismic Source Signature Estimation and Measurement; Geophysics Reprint Series No. 18; Society of Exploration Geophysicists; 1996; p. 261–269.

J. P. Lindsey; "Measuring wavelet phase from seismic data"; (This article is based on Lindsey's 1987 Fall Distinguished Lecture, "Wavelet extraction from seismic data with no phase assumption," presented to many SEG Sections.) Reprinted in Seismic Source Signature Estimation and Measurement; Geophysics Reprint Series No. 18; Society of Exploration Geophysicists; 1996; p. 294–300.

J. P. Lindsey; "A note on phase unwrapping"; Seismic Source Signature Estimation and Measurement; Geophysics Reprint Series No.18; Society of Exploration Geophysicists; 1996; p. 301–307. (Original contribution to this volume.).

N. S. Neidell; "Could the processed seismic wavelet be simpler than we think?"; Geophysics; vol. 56; No. 5; May 1991; p. 681–690; 7 Figs., 1 table. Reprinted in Seismic Source Signature Estimation and Measurement; Geophysics Reprint Series No. 18; Society of Exploration Geophysicists; 1996 p. 308–317.

A. P. Shatilo; "Seismic Phase Unwrapping: Methods, Results, Problems"; Geophysical Prospecting; 40; 1992; p. 211–225. Reprinted in Seismic Source Signature Estimation and Measurement; Geophysics Reprint Series No. I8; Society of Exploration Geophysicists; 1996; p. 318–332.

Umberto Spagnolini; "2–D phase unwrapping and phase aliasing"; Geophysics; vol. 58; No. 9; Sep 1993; p. 1324–1334; 9 Figures. Reprinted in Seismic Source Signature Estimation and Measurement; Geophysics Reprint Series No. 18; Society of Exploration Geophysicists; 1996; p. 333–343.

Sven Treitel and Enders A. Robinson; "Maximum entropy spectral decomposition of a seismogram into its minimum entropy component plus noise"; Geophysics; vol. 46; No. 8; Aug. 1981; p. 1108–1115; 7 Figs. Reprinted in Seismic Source Signature Estimation and Measurement; Geophysics Reprint Series No. 18; Society of Exploration Geophysicists; 1996; p. 344–352.

J. Longbottom and A. T. Walden and R. E. White; "Principles and Application of Maximum Kurtosis Phase Estimation"; Geophysical Prospecting; 36; 1988; p. 115–138. Reprinted in Seismic Source Signature Estimation and Measurement; Geophysics Reprint Series No. 18; Society of Exploration Geophysicists; 1996; p. 270–293.

Dennis C. Ghiglia and Mark D. Pritt; Two–Dimensional Phase Unwrapping—Theory, Algorithms, and Software; Chapter 1,2 and 3; 1998; Title page and pages v–xiv and p. 1–99; John Wiley & Sons, Inc.

\* cited by examiner

SYSTEM FOR MULTI-DIMENSIONAL DATA ANALYSIS

BACKGROUND OF THE INVENTION

1. Field of the Invention

This invention related to seismic data processing. More specifically, the invention relates to a system for organizing seismic data.

2. Background

Geophysical and geologic study of the subsurface structure of the earth continues to be an important field of endeavor for several reasons. The continued search for producing reservoirs of hydrocarbons, such as oil and gas, is a particularly important motivation for obtaining information about the earth's subsurface.

Conventional seismic surveying is generally performed by imparting energy to the earth at one or more source locations, for example by way of a controlled explosion, mechanical impact or the like. Return energy is then measured at surface receiver locations at varying distances and azimuths from the source location. The travel time of energy from source to receiver, via reflections and refraction from interfaces of subsurface strata is indicative of the depth and orientation of the subsurface strata.

The generation of instantaneous phase sections derived from seismic data is referred to in an article by Taner and Sheriff included in AAPG Memoir 26 from 1977, in which it is stated:

"The instantaneous phase is a quantity independent of reflection strength. Phase emphasizes the continuity of events; in phase displays . . . every peak, every trough, every zero-crossing has been picked and assigned the same color so that any phase angle can be followed from trace to trace." And "Such phase displays are especially effective in showing pinchouts, angularities and the interference of events with different dip attitudes."

Various phase unwrapping techniques are known, including those disclosed in Ghiglia, Dennis C. and Pritt, Mark D., *Two-Dimensional Phase Unwrapping Theory, Algorithms, and Software,* John Wiley & Sons, Inc., New York, N.Y., 1998. Methods of obtaining topography from synthetic aperture radar data have also used phase unwrapping techniques.

A long felt need continues to exist, however, for improved systems for organizing, storing and displaying seismic information to assist in the analysis and interpretation of the subsurface structure and geology.

SUMMARY OF THE INVENTION

A first embodiment of the invention comprises a method for analyzing seismic data in which a seismic data volume, which includes seismic data sample points, is selected from a subsurface region of interest. A geologic time volume is declared having data storage locations corresponding to the seismic data sample points. Geologic times are obtained corresponding to the seismic data sample points, and the geologic times are stored in the geologic time volume in data storage locations corresponding to the seismic data sample points.

DESCRIPTION OF THE PREFERRED EMBODIMENT

Figure 1:
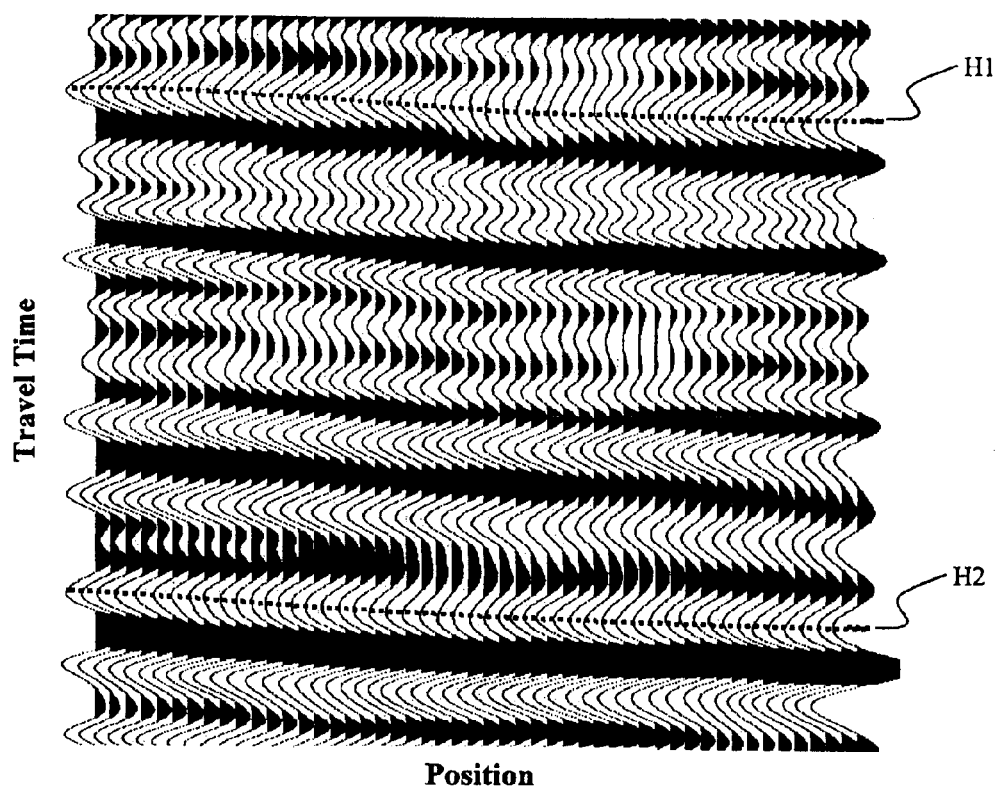
FIG. 1 shows a typical seismic data section.

FIG. 1 shows a representative seismic data section. For clarity, a two dimensional seismic data section is shown, although the invention described herein is applicable to three dimensional (3D) seismic data as well as to two dimensional (2D) seismic data, and the invention will be described herein primarily with reference to a 3D seismic data volume. Although the seismic data traces shown in FIG. 1 are shown as continuously sampled in the travel time direction, those of ordinary skill in the art will recognize that each seismic data trace is recorded by sampling the reflected seismic energy at discrete sample times at intervals typically ranging from 1 to 4 milliseconds.

In accordance with the present invention, a geologic time volume is generated in which the geologic times at which the sediment was deposited corresponding to the travel time (or depth) of the sample points of the seismic data traces of a seismic data volume are stored in memory locations on a data storage medium. The goal of generating a geologic time volume is to have a representation of geologic time for every sample point in a seismic data volume. Typically, in generating a geologic time volume from a seismic data volume, the geologic time volume will have the same spatial dimensions as the seismic data volume. Each x, y and z data point in the seismic data volume (where x and y represent the in-line and cross line directions and z represents the travel time or depth) will have a corresponding point in the geologic time volume. The seismic data volume might typically include 2000 cross line and 2000 in-line data samples, and may extend for a depth of greater than 3000 time samples. The difference between the geologic time volume and the seismic data volume is that the value of the data point in the geologic time volume will be related to geologic time, rather than reflection amplitude (or other measured or calculated seismic attribute value).

Figure 2:
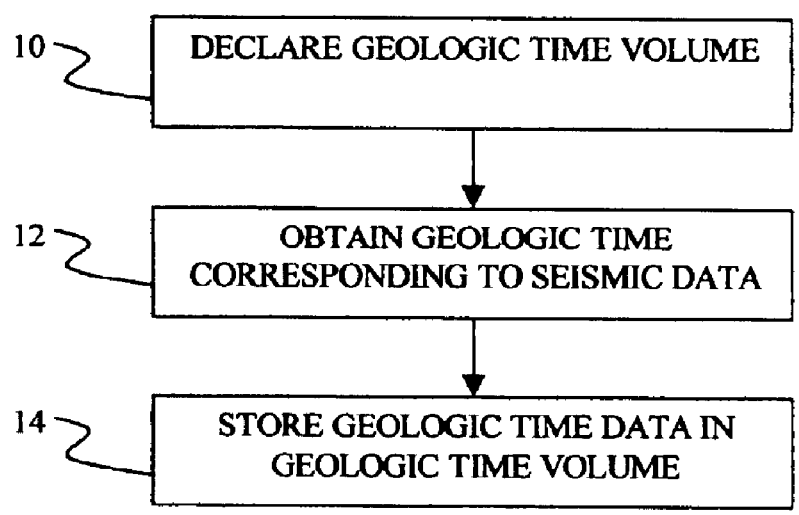
FIG. 2 is a flow chart of an embodiment of the invention.

As outlined in FIG. 2, in a preferred embodiment of the invention, in step 10 a volume of memory locations, which may reside in a computer RAM or on a magnetic or optical or other storage medium, is declared corresponding to a seismic data volume for which a geologic time volume is to be generated. Typically, this volume of memory is initialized with a value (such as zero) to designate a currently undetermined geologic time. In step 12 the geologic times corresponding to sample points included in the seismic data volume are obtained, and in step 14, these geologic times are stored in the geologic time volume. Those of ordinary skill in the art will recognize that the geologic time volume in which geologic time is stored comprises a plurality of storage locations, which could be on a computer RAM memory, or on a magnetic, optical or other storage medium, such as a magnetic or optical disk or magnetic tape, or other suitable storage media, and that geologic time can be stored in a variety of compressed and/or encrypted formats. The geologic time in step 12 may be pseudo geologic time. As used herein the term "pseudo geologic time" means relative geologic time. The pseudo geologic time assigned to a particular subsurface location may be an arbitrary number which will be greater than the pseudo geologic time assigned to a location above the particular location, and less than the pseudo geologic time assigned to a location below said particular location. The pseudo geologic time which is then stored in the geologic time volume in step 14 may then be calibrated to true geologic time. Those of ordinary skill in the art will understand that "true" geologic time is determined from measurements or estimates, and the terms "true geologic time", "estimated geologic time" and "measured geologic time", may be used herein, depending on the context, to distinguish the geologic time being referred to from pseudo geologic time.

As discussed further hereinafter, geologic time is normally measured in millions of years before the present time and geologic time values will normally span a large range within a single seismic data set. In some situations it might be possible to use an integer representation for the geologic time values, but the number of geologic time values will be limited if an integer representation is used. For example, in the case of 8 bit integers, only 256 geologic time values may be represented. Typically, geologic time values are best represented as floating point numbers.

Figure 3:
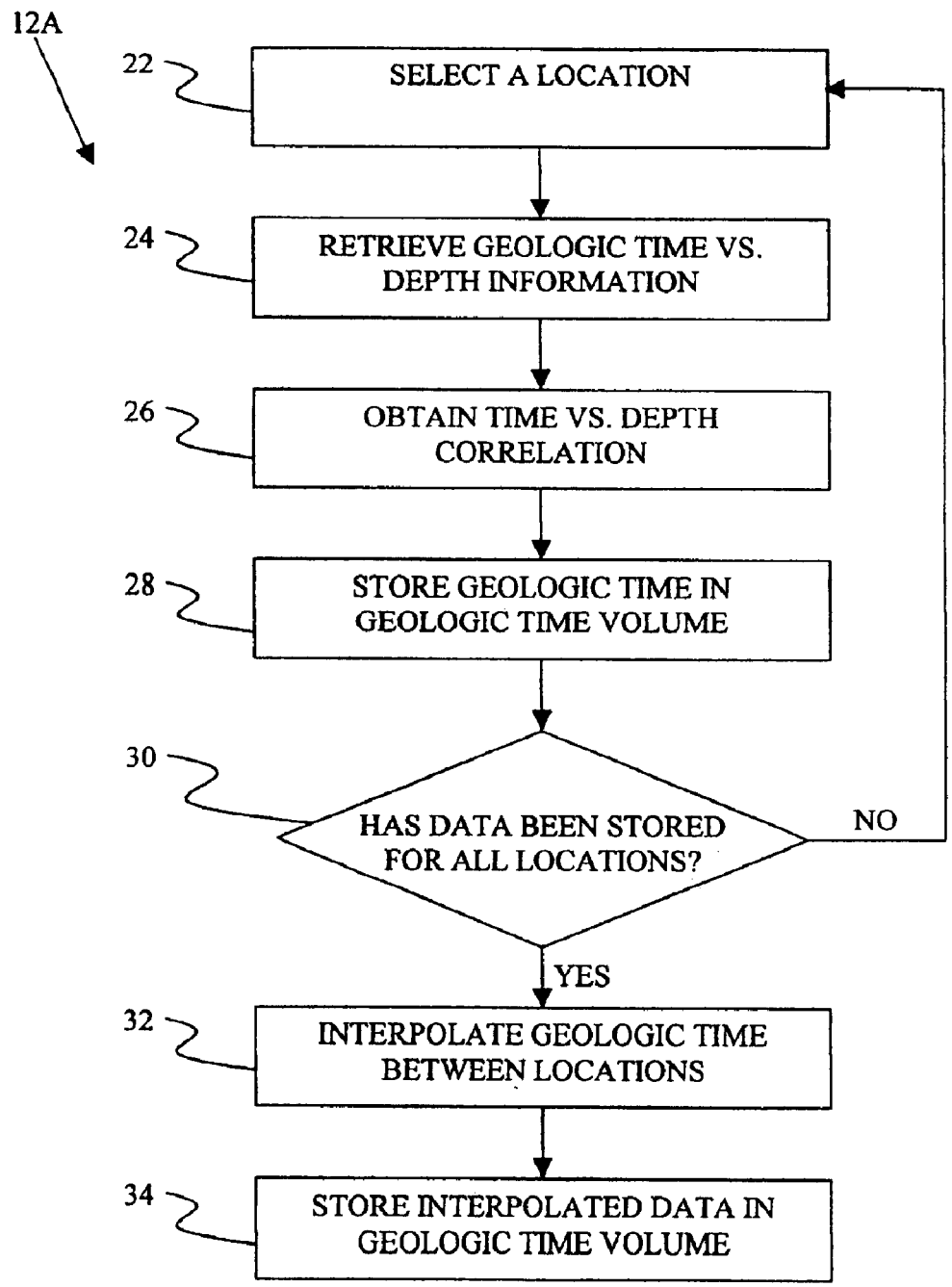
FIG. 3 is a flow chart of another embodiment of the invention.
Figure 4:
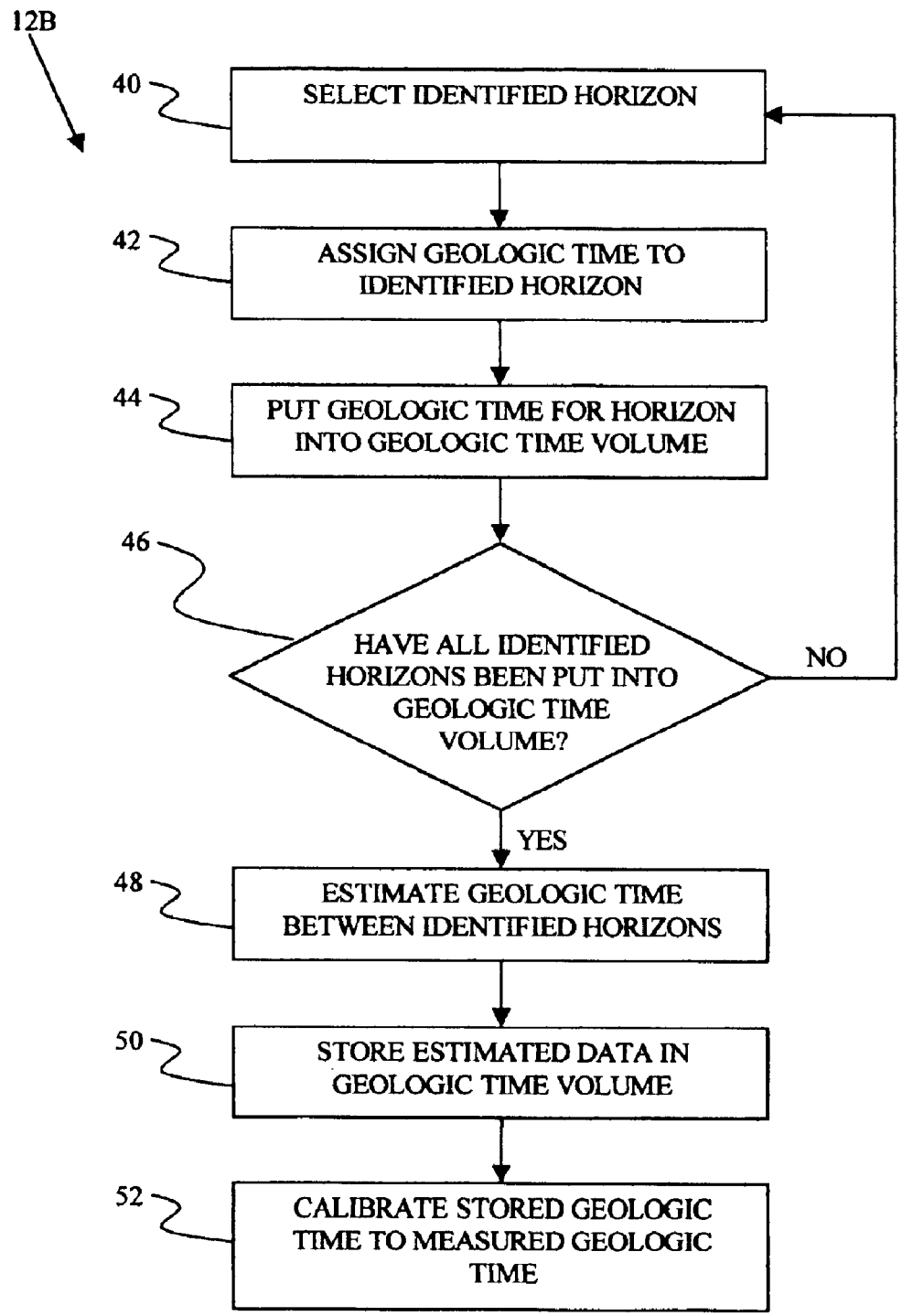
FIG. 4 is a flow chart of yet another embodiment of the invention.
Figure 5:
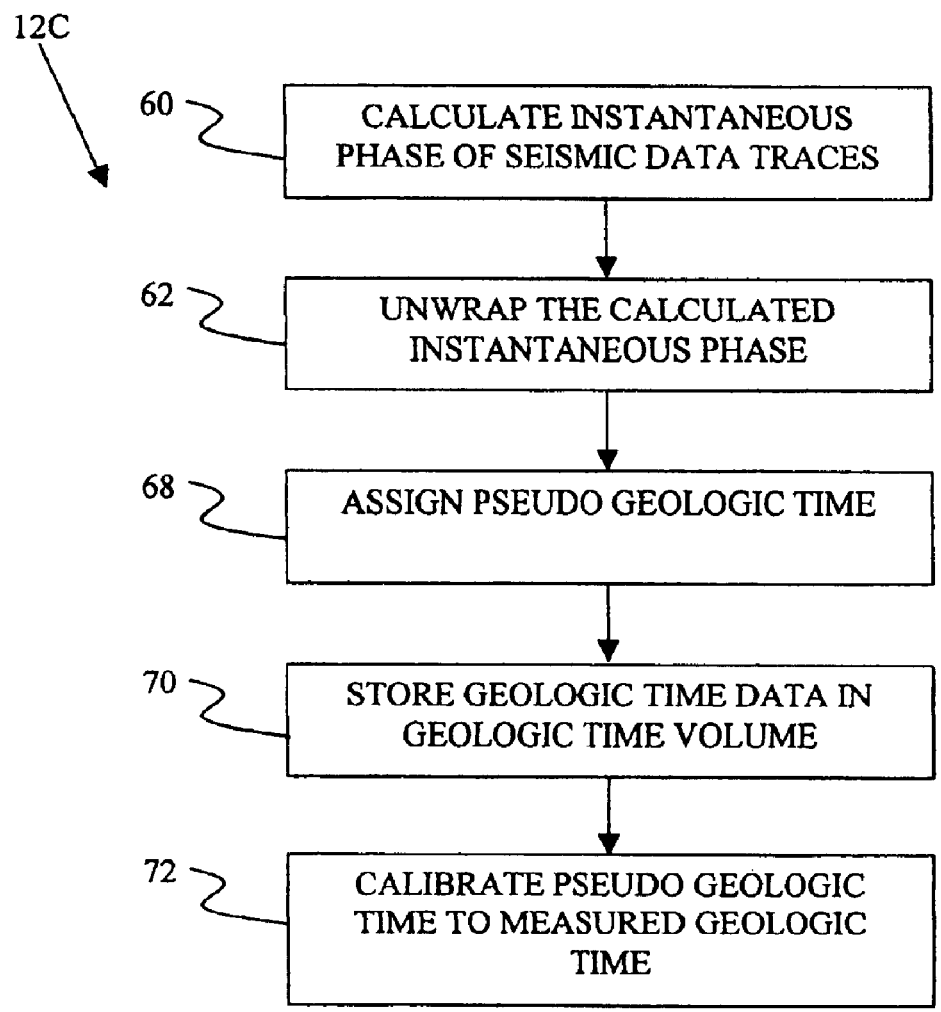
FIG. 5 is a flow chart of yet another embodiment of the invention.

In step 12 of FIG. 2, the geologic time corresponding to seismic data sample time may be obtained in a number of ways, including but not limited to embodiments outlined in FIGS. 3, 4 and 5. One embodiment, as outlined in FIG. 3 and denoted by reference designator 12A, utilizes a relationship between true geologic time data and seismic signal travel time (which may be referred to herein as a "geologic time vs. travel time function"). True geologic time data may be obtained from rock samples from wellbores (including core samples and drill cuttings), well log data and other data sources. In a second embodiment, as outlined in FIG. 4 and denoted by reference designator 12B, horizons, such as horizons H1 and H2 of FIG. 1, are identified in a seismic data set using interpretation procedures known to those of ordinary skill in the art. In a third method, as outlined in FIG. 5, and denoted by reference designator 12C, the unwrapped instantaneous phase of the recorded seismic data is related to geologic time. Unwrapped instantaneous phase may also be utilized in conjunction with the embodiment described with reference to FIG. 3 for estimating geologic time between the locations from which data from rock samples from wellbores (including core samples and drill cuttings), well log data or other data sources are available. Further, unwrapped instantaneous phase may be used in conjunction with the embodiment described with reference to FIG. 4 for estimating geologic time between the locations of identified horizons.

With reference to FIG. 3, a geologic time versus travel time function may be obtained from locations (primarily, but not limited to, well locations) for which there are data correlating geologic time and depth, and for which there is a seismic signal travel time and depth correlation. The geologic time versus depth correlation and the travel time to depth correlation may be combined to obtain a geologic time versus seismic signal travel time curve. It will be understood that the geologic time volume may also be generated in terms of geologic time versus depth corresponding to seismic signal travel time. With reference to FIG. 3, a location is selected in step 22, and in step 24, available geologic time vs. depth information is retrieved. Sources of geologic time data may include microfossils observed in rock samples from wellbores (including core samples and drill cuttings), well log data, including diagnostic well log patterns resulting from marker beds of a known age from areas where the geology is well known, charts of the rise and fall of sea levels and other data sources. In step 26 the seismic signal travel time and depth correlation is obtained, and a correlation established between geologic time and seismic signal travel time. In step 28, the determined geologic time is stored in the geologic time volume in locations corresponding to the data location and to the seismic signal travel time (or depth corresponding to travel time). In step 30, a determination is made as to whether data have been stored in the geologic time volume for all available locations for which geologic time data are available. If data for additional locations are available, steps 22, 24, 26, 28 and 30 are repeated until all available geologic time data have been stored in the geologic time volume. In step 32, geologic times between locations for which geologic time data are available, both vertically and horizontally, are interpolated. In step 34 the interpolated geologic time data are stored in the geologic time volume. Those of ordinary skill in the art will understand that the order in which steps 22, 24, 26, 28, 30, 32 and 34 are performed may be interchangeable.

Preferably, a geologic time value will be specified for every seismic data sample point, including data points between locations for which geologic time data are available. In assigning geologic time between vertically displaced locations for which geologic time data are available, a straightforward method for performing step 32 is to assign the same geologic time to all sample points between locations for which geologic time data are available. The assigned value may be the geologic time of either the shallower or the deeper location, so long as the assigned value is used consistently. Use of this method will result in a plurality of sample points within a seismic trace being designated with the same geologic time. Other more complex interpolation methods may also be utilized for performing step 32. Such interpolation methods may include, but are not limited to: (a) constant geologic time increment for each data sample below the shallower location, (b) constant geologic time increment for each data sample above the deeper locations, (c) linear interpolation based on the number of samples between the two locations and the geologic time difference between the two locations, (such that the geologic time of a point that is half way between the two locations is the average geologic time of the two locations), (d) interpolation proportional to the number of peaks, troughs and/or zero crossings present in the seismic data between the two locations, or (e) interpolation based on the unwrapped instantaneous phase between the two locations as described further below with reference to FIGS. 5 and 6. Interpolations between horizontally displaced locations may also be performed in substantially the same manner as interpolations between vertically displaced locations.

With reference to FIG. 4, interpreted horizons are identified in the seismic data utilizing data interpretation procedures known to those of ordinary skill in the art, and these horizons are utilized in building a geologic time volume. As indicated in FIG. 4, in step 40 an identified horizon is selected from the seismic data or an interpretation data base. In step 42, a geologic time is assigned to the horizon. Because a horizon is the boundary where the geologic time changes, points on a horizon (other than locations of unconformities) will represent the same geologic time, and all points included in the horizon, at least initially, may be assigned the same geologic time. In order to treat horizons which are interpreted to be unconformities as a single geologic time value a convention must be established to use either the maximum, the minimum or the average time represented by the unconformity. Either the maximum, minimum or average time may be used so long as it is used consistently. It is preferable, however, to assign a geologic time to an unconformity which varies laterally along the surface of the unconformity, if sufficient information is available to do so.

An assigned geologic time may be actual geologic time, assigned on the basis of available paleontological data or other information obtained from wells, outcrops, relative sea-level charts and other sources, or the geologic time may be an assigned pseudo geologic time. The assigned pseudo geologic time for a horizon may be an arbitrary number greater than the geologic time assigned to other horizons identified above the horizon, and less than the geologic time assigned to other horizons identified below the horizon. In step 44, the geologic time for the interpreted horizon is put into appropriate locations in the geologic time volume. In step 46, a decision is made as to whether the geologic time for all identified horizons have been put into the geologic time volume. If additional horizons have been identified, steps 40, 42, 44 and 46 are repeated until the geologic time for all horizons of interest have been put into the geologic time volume. The more horizons that are identified and used, and the higher the quality of each identified horizon, the more accurate the geologic time volume will be. Typically, all horizons identified in the seismic data volume will be put into the geologic time volume. In step 48 the geologic times at locations between the identified horizons are estimated. In step 50 the geologic times estimated in step 48 are stored in the geologic time volume. In step 52, if the stored geologic time is pseudo geologic time, the stored geologic time is calibrated to measured geologic time, based on available data relating specific seismic travel times (or depths) to geologic time. The calibrated geologic time is then stored in the geologic time volume. Those of ordinary skill in the art will understand that the order in which steps 40, 42, 44, 46, 48, 50 and 52 are performed may be interchangeable.

Preferably, a geologic time value will be specified for every seismic data sample point, including data points between the identified horizons. A straightforward method for performing step 48 is to assign the same geologic time to all sample points between two horizons. The assigned value may be the geologic time of either the shallower horizon or the deeper horizon, so long as the assigned value is used consistently. Use of this method will result in a plurality of sample points within a seismic trace being designated with the same geologic time. Other more complex interpolation methods may also be utilized for performing step 48. Such interpolation methods may include, but are not limited to: (a) constant geologic time increment for each data sample below the shallower identified horizon, (b) constant geologic time increment for each data sample above the deeper identified horizon, (c) linear interpolation based on the number of samples between the two horizons and the geologic time difference between the two horizons, (such that the geologic time of a point that is half way between the two horizons is the average of the geologic time of the two horizons), (d) interpolation proportional to the number of peaks, troughs and/or zero crossings present in the seismic data between the two horizons, or (e) interpolation based on the unwrapped instantaneous phase between the two horizons as described further below with reference to FIGS. 5 and 6.

With reference to FIG. 5, estimates of geologic time corresponding to the seismic data trace sample time may be generated by unwrapping the instantaneous phase of the seismic data traces and relating the unwrapped instantaneous phase values to geologic time. One of the unique aspects of the present invention is the recognition that the unwrapped phase is related to geologic time. Accordingly, in a normal seismic section (one without reverse faults or overturned beds) unwrapped phase will increase with travel time, and a constant phase value will locally follow a surface of constant geologic time. Therefore, in a 3D volume, a surface of constant unwrapped phase will normally coincide with a surface of constant geologic time.

Figure 6:
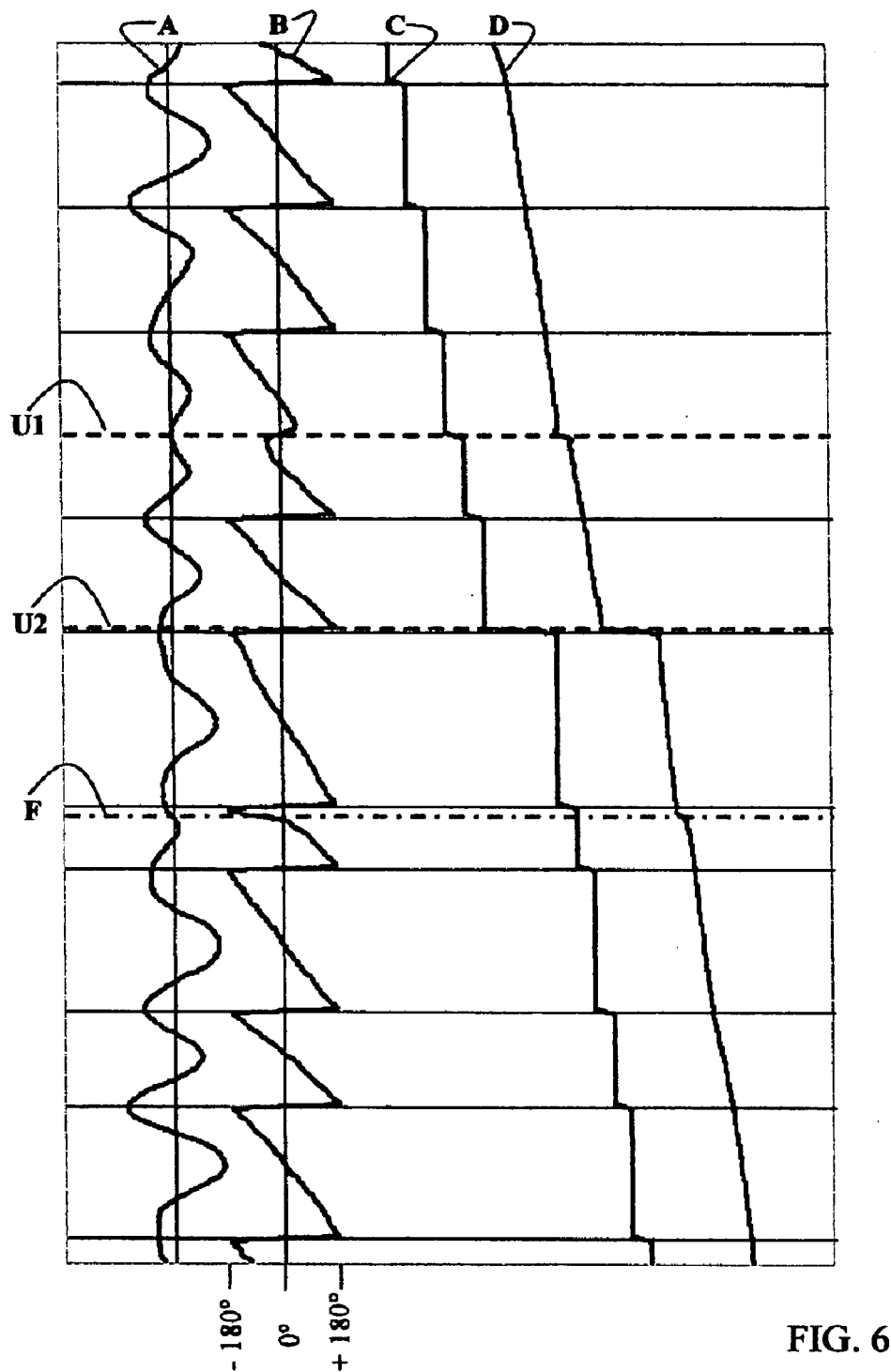
FIG. 6 illustrates the unwrapping of instantaneous phase.

Phase unwrapping is illustrated in FIG. 6. A synthetic seismic data trace is shown designated by reference A in FIG. 6. This trace is from location 201 of a synthetic seismic line shown in FIG. 7. Reference letter B in FIG. 6 refers to the instantaneous phase (IP) of the seismic data trace designated by reference A. Reference letter C in FIG. 6 refers to the cycle number (n) of the instantaneous phase. The cycle number (n) is an integer equal to the number of complete cycles through which the instantaneous phase has cycled. Reference letter D in FIG. 6 refers to the unwrapped phase ($\phi$) corresponding to the seismic data trace referred to by reference letter A. As stated above, unwrapped phase is related to geologic time, although the relationship may not be linear.

As illustrated in FIG. 6, a seismic data trace (referred to by reference letter A) comprises successive phase segments, with the instantaneous phase of the seismic signal progressing through a 360 degree phase shift in each segment, and with the value of the instantaneous phase (IP) ranging from −180 to +180 degrees (or −$\pi$ to +$\pi$ radians). Since the phase values wrap (repeat) when the phase value reaches +180 degrees, a value of +180 degrees is the same as −180 degrees. The solid horizontal lines in FIG. 6 indicate where the instantaneous phase changes from +180 degrees to −180 degrees. And because the instantaneous phase of the seismic data trace successively cycles through 360 degree intervals, the unwrapped phase value for any particular point on the seismic data trace is IP+360n degrees (or IP+n2$\pi$ radians), where IP is the instantaneous phase and n is an integer equal to the number of complete cycles through which the instantaneous phase has cycled through between a reference location on the seismic trace (which may be the beginning of the seismic signal) and a particular point on the seismic trace.

Accordingly, the relationship between instantaneous phase (IP), cycle number (n) and unwrapped phase ($\phi$) is as follows:

$$\phi = IP + 360n \tag{Eq. 1}$$

Note, in FIG. 6, with reference to reference letter A, that the peak of the seismic data trace corresponds to an instantaneous phase of 0 degrees while a trough corresponds to an instantaneous phase of 180 degrees, and that, because of wrapping:

$$+180° = -180°,\qquad\text{(Eq. 2)}$$

and that the zero crossings occur at +90 degrees and at −90 degrees.

In FIG. 6, the dotted lines indicate a minor unconformity U1, a major unconformity U2, and a fault F. The major unconformity U2 is evident by the large jump in the cycle number and pseudo geologic time value. Notice that the unconformity marked by U1 occurs where the instantaneous phase jumps from a small positive to a small negative number.

FIG. 5 shows steps performed in unwrapping instantaneous phase to estimate geologic time. In step 60 of FIG. 5 the instantaneous phase of the seismic data traces in a seismic data volume is calculated. In step 62 of FIG. 5, the calculated instantaneous phase is unwrapped. In step 68, pseudo geologic time is assigned using the unwrapped phase. (This may be accomplished by just using the values of unwrapped phase as the pseudo geologic time values.). In step 70 the pseudo geologic time is stored in a geologic time volume. In step 72 the pseudo geologic time may be calibrated to measured geologic time.

A number of phase unwrapping techniques are known to those of ordinary skill in the art and these techniques will not be discussed in detail herein. For example, Ghiglia and Pritt (Ghiglia, Dennis C. and Pritt, Mark D., *Two-Dimensional Phase Unwrapping Theory, Algorithms, and Software,* John Wiley & Sons, Inc., New York, N.Y., 1998) provide a discussion of eight different phase unwrapping methods. The methods disclosed in Ghiglia and Pritt solve for the unwrapped phase directly, and do not directly generate values of n. If methods are utilized which solve for the unwrapped phase directly without generating a value for n, n may be calculated as follows:

$$n = \frac{\phi - IP}{360}.\qquad\text{(Eq. 3)}$$

Figure 9:
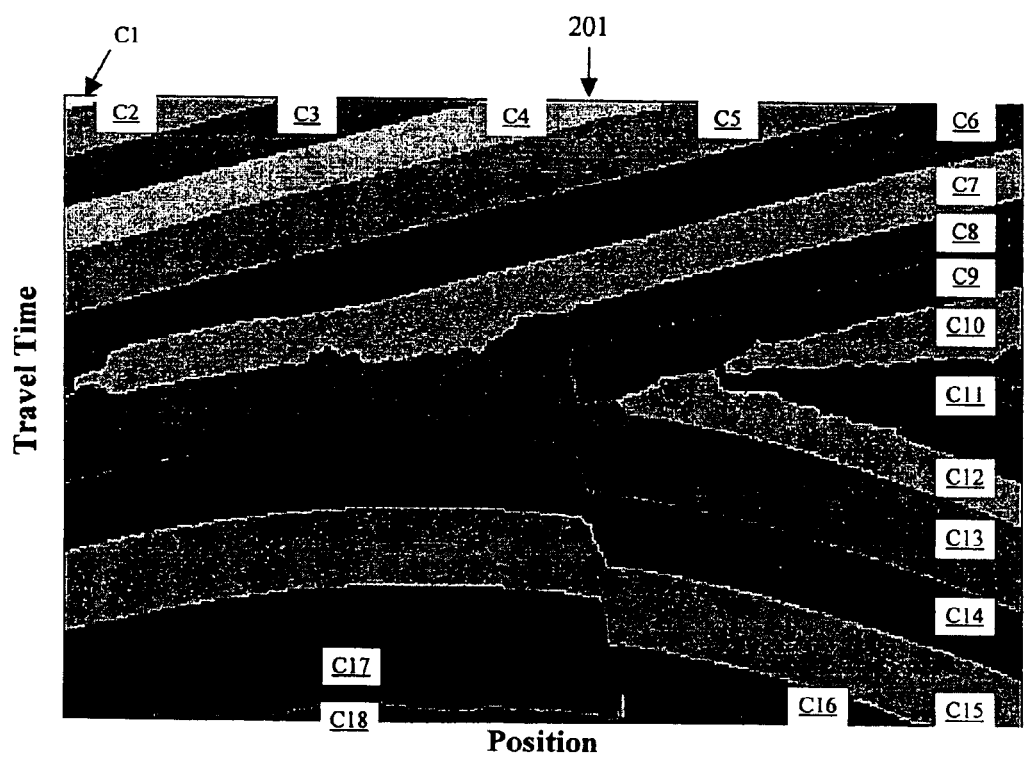
FIG. 9 is a display of cycle numbers.

It may be useful to calculate a value for n, because displaying values of n is a useful display tool for showing phase unwrapping results. FIG. 9 illustrates displaying the values of n using a gray scale in which locally adjacent gray values are distinctively different in order to easily see the changes in the cycle number. FIG. 9 shows eighteen cycles, numbered from C1 to C18. Other gray scales may also be used, as well as a color scale in which locally adjacent colors are distinctly different. As discussed further hereinafter, it may also be useful to calculate values for n because cycle numbers may be used in reconciling the differences between unwrapped phase at brick boundaries when working with large data volumes, or between adjacent lines when using 2D phase unwrapping processes for performing 3D phase unwrapping.

The phase unwrapping methods described in Ghiglia and Pritt are described in the context of two dimensions, however, it will be apparent to those of ordinary skill in the art that the concepts are extendible to more than two dimensions. The seismic application can extend into three dimensions when applied to 3D seismic data. Further, when the source receiver offset geometry of the data collection process is taken into consideration, the offset geometry adds another dimension, and when data are collected several times over the same area (time lapse or repeat surveys), time becomes another dimension.

Normally, locations where the instantaneous phase jumps from +180 degrees to −180 degrees are locations where the value of n is incremented by one cycle number. However, phase unwrapping techniques and/or the application of data interpretation procedures may determine that the value of n should be incremented by an integer greater than one at certain locations where the instantaneous phase jumps from +180 degrees to −180 degrees (for example, dotted line at location U2 in FIG. 6). Locations where the cycle number should be incremented by more than one could include locations where the magnitude of the difference in the unwrapped phase between the two successive data points is smaller than is typical of other locations where the instantaneous phase jumps from +180 degrees to −180 degrees.

Some locations where the cycle number should be incremented by more than one are anomalous locations. An anomalous location is evidenced by either a smaller or larger magnitude of difference in the unwrapped phase between two successive data points, than is typical of other locations in a data volume.

Whenever the magnitude of change in n is greater than 1 between two adjacent samples, then the two points are on opposite sides of either: (a) an unconformity, (b) a fault, (c) a fluid contact, or (d) the result of some type of noise contamination (e.g. multiple or sideswipe energy). Many of these points will be detected by the automatic phase unwrapping algorithm. However, intervention by the data processor may be required to obtain a geologically reasonable result. The judgment of the data processor may be required to make a decision as to whether noise contamination is present.

The phase unwrapping algorithms and/or the data interpretation analysis may also determine locations where n should be incremented at locations other than where the instantaneous phase jumps from +180 degrees to −180 degrees. In general, anytime the change in instantaneous phase is negative between a first data point in a seismic trace and a second data point in a seismic trace, where the second data point is lower than the first data point, either the cycle number needs to change by at least 1, or the data needs to be edited slightly due to noise. The judgment of the data processor may be required to make a decision as to whether to edit the data or to increment the cycle number. In FIG. 6 dotted line U1 illustrates a location where the phase does not change from +180 degrees to −180 degrees, but n is incremented.

With a few exceptions, geologic time always increases with either travel time or depth. In areas of reverse or thrust faults or overturned folds (beds), however, geologic time and, accordingly, the value of n will decrease with depth across the reverse or thrust fault or in the overturned limb of the fold. In the case of a reverse or thrust fault, a section of geologic time will be repeated, but in this repeated section, geologic time will still increase with depth. In the case of overturned beds, geologic time will also be repeated, but for the overturned beds, geologic time will decrease with depth. Normally, the judgment of an interpreter is necessary in order to identify such locations. Typically, if a phase unwrapping algorithm results in the value of n decreasing with increasing seismic signal travel time, this will indicate a local error in the phase unwrapping procedure or the calculation of pseudo geologic time.

In unwrapping instantaneous phase to create an estimate of geologic time, additional constraints can be used to improve the results. These constraints may be used to precondition the data prior to applying unwrapping routines, incorporated into the unwrapping algorithms to create modified unwrapping methods that will result in more geologically meaningful results, or applied to the results of unwrapping routines to evaluate and potentially correct the results.

The first constraint, normally used for analysis of sedimentary deposits that have not been strongly folded, tilted, or faulted, constrains the youngest stratum to be at the top, and constrains the oldest stratum to be at the bottom. Because instantaneous phase is related to geologic time, which increases with depth (or two way travel time), the unwrapped instantaneous phase will increase with increasing depth. Therefore, by either requiring the first derivative of the unwrapped phase to be positive, or minimizing the number of successive sample times the first derivative can be negative, a more meaningful geologic time volume will result from the unwrapping process.

The first constraint may be applied as a two part phase quality and editing test in a pre-processing mode to precondition the data to help stabilize the phase unwrapping.

The first part of the phase quality and editing test is the verification that the instantaneous phase was generated so that it increases with seismic signal travel time, which means that the phase wraps from +180 degrees to −180 degrees instead of from −180 degrees to +180 degrees. If the instantaneous phase was generated so that it decreases with increasing travel time, the instantaneous phase may be multiplied by −1 so that it increases with travel time.

The second part of the automated phase quality and editing test is to determine all locations at which the first derivative of the instantaneous phase is negative for two or more vertically consecutive samples. (One negative sample will result from a transition from +180 degrees to −180 degrees. However, two successive negative samples will indicate that instantaneous phase is decreasing with time.) These locations are likely to cause problems in the phase unwrapping. Normally these points are not where the phase is changing from +180 degrees to −180 degrees. Normally the locations where the derivative is negative indicate fringe lines and are only one sample thick. It is best to minimize the effect on the phase unwrapping process of the locations where the instantaneous phase is negative for two or more vertically consecutive points. If the points appear to the data processor to be caused by noise, all of the negative points may be removed, otherwise all but one of the negative points may be removed. Removing these points can be accomplished in several ways. One way to remove them is by slightly modifying the instantaneous phase values so the first derivative of instantaneous phase at the point is a positive number close to zero. A second method can be used if the phase unwrapping technique being employed uses a quality mask. In this case these points are set to either a low quality value or the background value so these points are the last points to be unwrapped, or they are ignored entirely depending upon the mask values and unwrapping algorithm used.

Phase unwrapping is performed after performance of the two part automated phase quality and editing test.

The second constraint is to utilize disturbances in the local continuity of the instantaneous phase to determine the best location for branch cuts or determine low quality zones, which are used in some phase unwrapping algorithms. When sediments are first deposited they are normally approximately parallel to the surface on which they are deposited. This implies that when the resultant geologic time has large deviations from the local dip of a surface of constant geologic time, then something has disturbed this normal pattern. These disturbance locations can be expected to be concentrated along, and caused by unconformities, faults, hydrocarbon fluid contacts, or areas of noise contamination. These disturbance locations may be set to either a low quality value or the background value so these locations are the last locations to be unwrapped, or they may be ignored entirely depending upon the mask values and unwrapping algorithm used.

Once a geologic time volume has been created, it can be scanned to determine the locations at which the geologic time does not increase with increasing travel time, and these points may be denoted in an appropriate manner. These points may indicate problems either with the input data or the phase unwrapping results. These points should be denoted in the geologic time volume as having an unknown or potentially incorrect geologic time.

Figure 7:
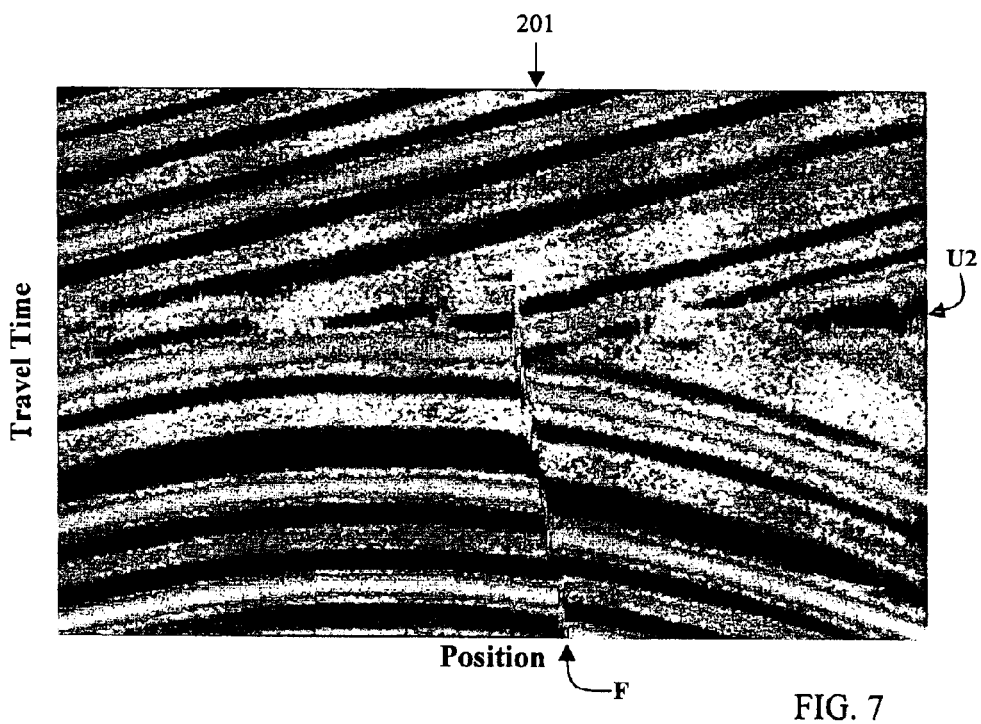
FIG. 7 is a synthetic seismic data section illustrating an implementation of the invention.
Figure 8:
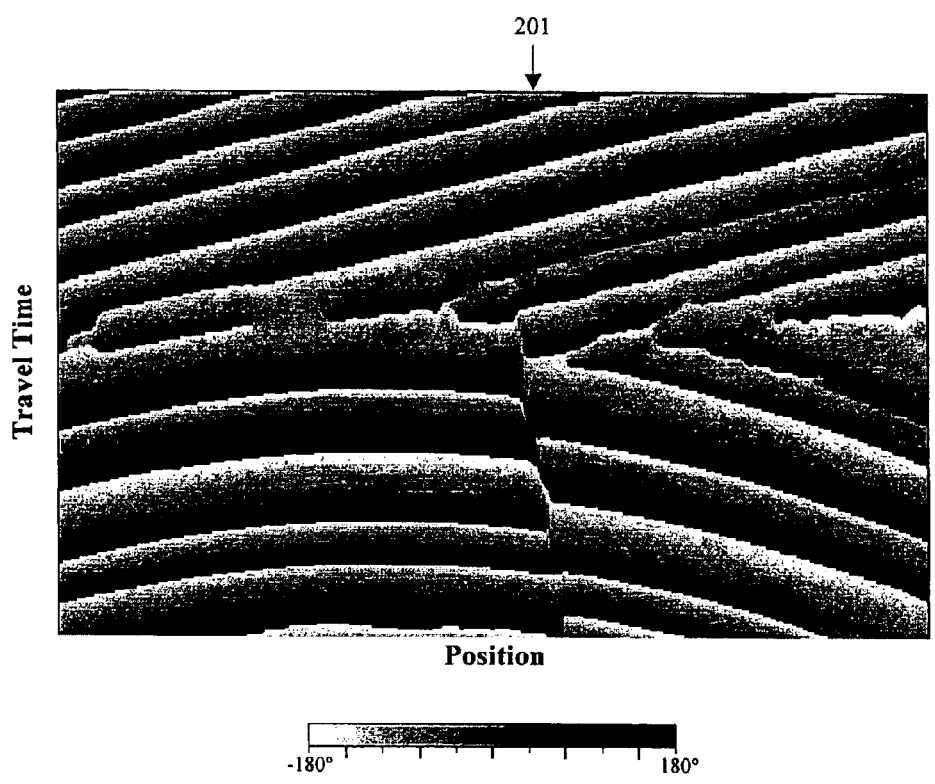
FIG. 8 is a display of instantaneous phase.
Figure 10:
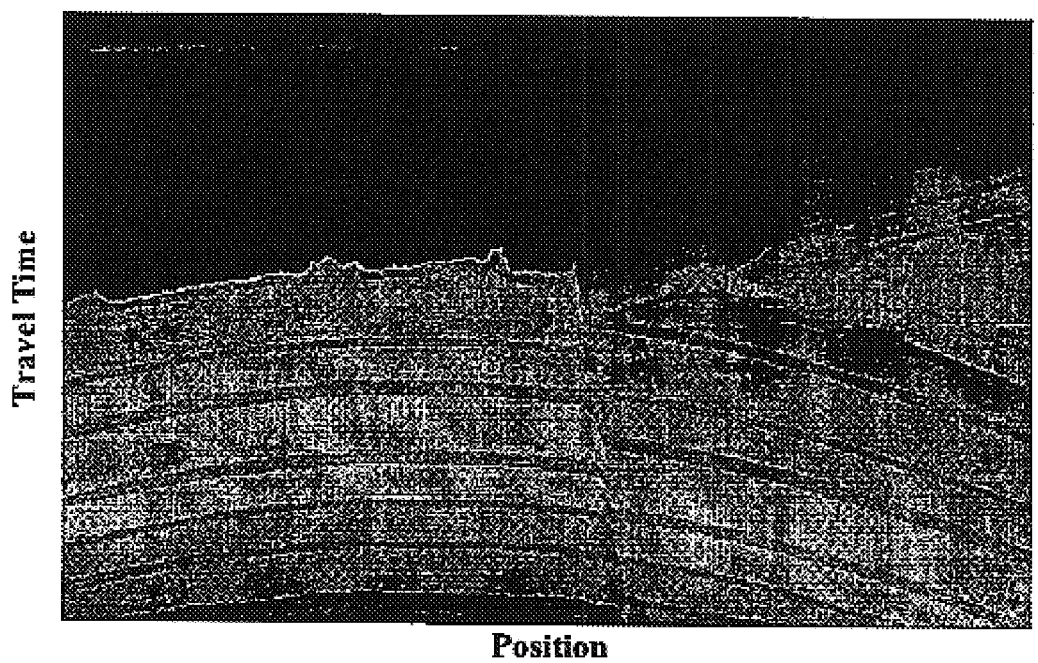
FIG. 10 is a display of estimated geologic time

FIG. 7, FIG. 8, FIG. 9, and FIG. 10 illustrate the application of a phase unwrapping method to obtain a section of geologic time versus travel time. FIG. 7 is the synthetic data used as input. FIG. 8 is a gray scale showing instantaneous phase of the seismic data section of FIG. 7. FIG. 9 and FIG. 10 contain the results of phase unwrapping. FIG. 9 shows the cycle number n using a gray scale in which cycles C1 through C18 are displayed. FIG. 10 was generated from unwrapping the instantaneous phase shown in FIG. 8, and shows a representation of pseudo geologic time. The relationship between the data displayed in FIG. 8, FIG. 9, and FIG. 10 is governed by Equation 1.

Figure 11:
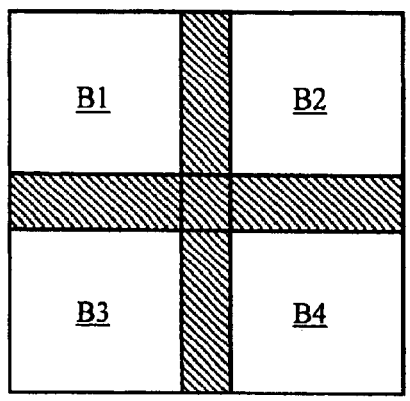
FIG. 11 illustrates adjoining bricks useful for implementing an embodiment of the invention for large data volumes.

Because the unconformity identified by reference U2 in FIG. 7 goes from one end of the line to the other, there is some ambiguity in unwrapping the instantaneous phase. It is clear from the differences in the bed dips that some geologic time is missing due to the unconformity, but there is not enough information to determine the amount of missing time. In the region below the unconformity, the relative changes in n are correct, but the value of n is unknown because of the missed time. From superposition of the beds, it is also clear that the reflectors directly above the unconformity on the left side of the section are younger than the reflectors which are directly above the unconformity on the right side of the section. If the spatial dimensions of the survey are increased, the amount of ambiguity across the unconformity may decrease. When the pseudo geologic time values are calibrated to true geologic time, the ambiguity across the unconformity may be resolved (or at least reduced). Going across the fault F, some correlation of the reflectors must be made. If the correlation across the fault is in error, the resulting pseudo geologic time values will be off in that fault block. However, the relative pseudo geologic time values within the fault block should not be affected by an improper correlation across the fault. Note that the unconformity appearing in FIG. 7 is the major unconformity identified as U2 in FIG. 6. The minor unconformity, identified as U1 in FIG. 6 is not really visible in FIG. 7. A significant aspect of the present invention is that unconformities are identifiable that might not show up in a typical seismic section As the size of a 3D seismic data volume increases, the required computation and interpretation time for developing the geologic time volume will typically increase even more. For example, if the volume size increases by a factor of 4, the computation and interpretation time might increase by a factor significantly greater than 4. Therefore, it is advantageous to utilize a method for generating a geologic time volume from large 3D seismic data volumes for which the computation and interpretation time does not grow significantly faster than the volume size growth. In one implementation of the invention the seismic data volume is broken up into a plurality of contiguous or overlapping volumes, which will be referred to herein as "adjoining bricks". Use of volumes having at least one trace or sample overlap in all directions may be computationally more straightforward than use of volumes which are merely contiguous, and in a preferred embodiment such volumes may be referred to as "overlapping bricks". However, contiguous bricks may also be utilized, and the procedure for utilizing contiguous brick is the same as for using overlapping bricks, except that instantaneous phase and cycle boundaries would need to be substantially continuous across brick boundaries, rather than coextensive as they would need to be if the bricks overlapped. This "adjoining brick" or "overlapping brick" method may achieve a higher quality result with less computational and interpretational effort than if the entire geologic time volume were computed from a single large data set. FIG. 11 shows an example of a seismic data volume broken up into overlapping bricks, B1, B2, B3 and B4, with the crosshatched area representing the region of overlap. The bricking can occur in all three dimensions. If the dimensions of the bricks are powers of two, such as 256×256×256, then Fast Fourier Transform (FFT) phase unwrapping methods can be easily employed.

In the context of this embodiment, consecutive individual in-lines and cross lines from a 3D seismic survey can be considered as adjoining bricks.

Figure 12:
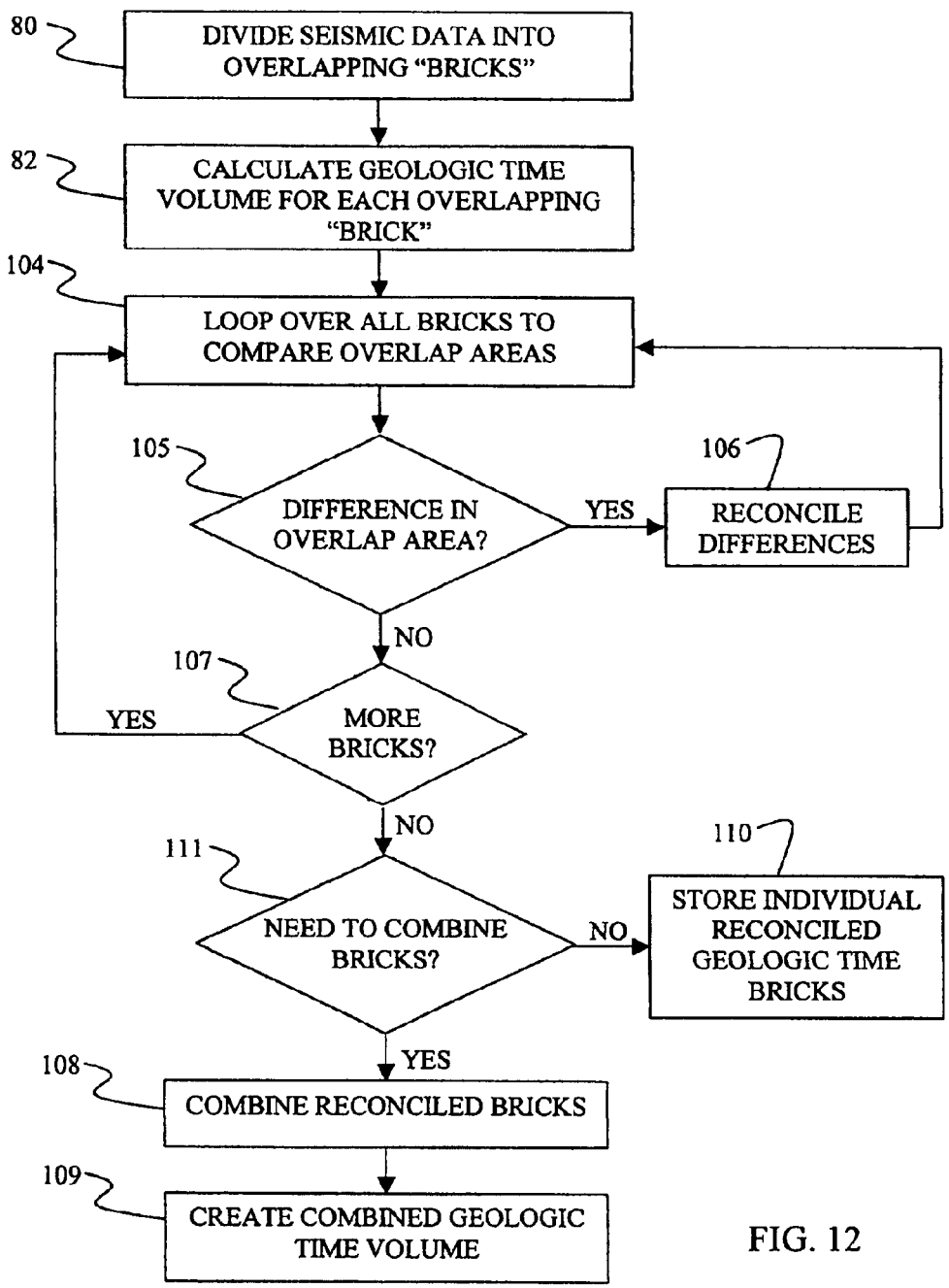
FIG. 12 is a flow chart of an embodiment of the invention for large data volumes.

FIG. 12 is a flow chart showing use of a "bricking" method for reducing the effort for generating a geologic time volume. In step 80, the seismic data volume is divided into subvolumes, referred to herein as "bricks", and in step 82, a geologic time volume is developed for each "brick". In step 104, the regions where the bricks overlap are compared to determine if there are differences. In step 105, the question is asked if there is a difference in the overlapping regions of the bricks. If the answer is Yes, these differences are reconciled in step 106, and step 104 is repeated. A process of steps 104 and 106 is outlined in more detail in the discussion with reference to FIG. 13. If the answer in step 105 is No, the question is asked in step 107 whether there are more bricks to compare. If the answer is Yes the process returns to step 104. If the answer in step 107 is No, then the question is asked in step 111 whether there is a need to combine the bricks. If the answer is question 111 is No, then the reconciled geologic time volumes of the individual bricks are stored in step 110. If the answer in question 111 is Yes, then in step 108 reconciled bricks are combined, and in step 109 the combined reconciled bricks are stored in a combined geologic time volume. There are times in which it might be useful to store the individual reconciled bricks, rather than combining them into one large geologic time volume, especially for very large seismic data volumes.

Figure 13:
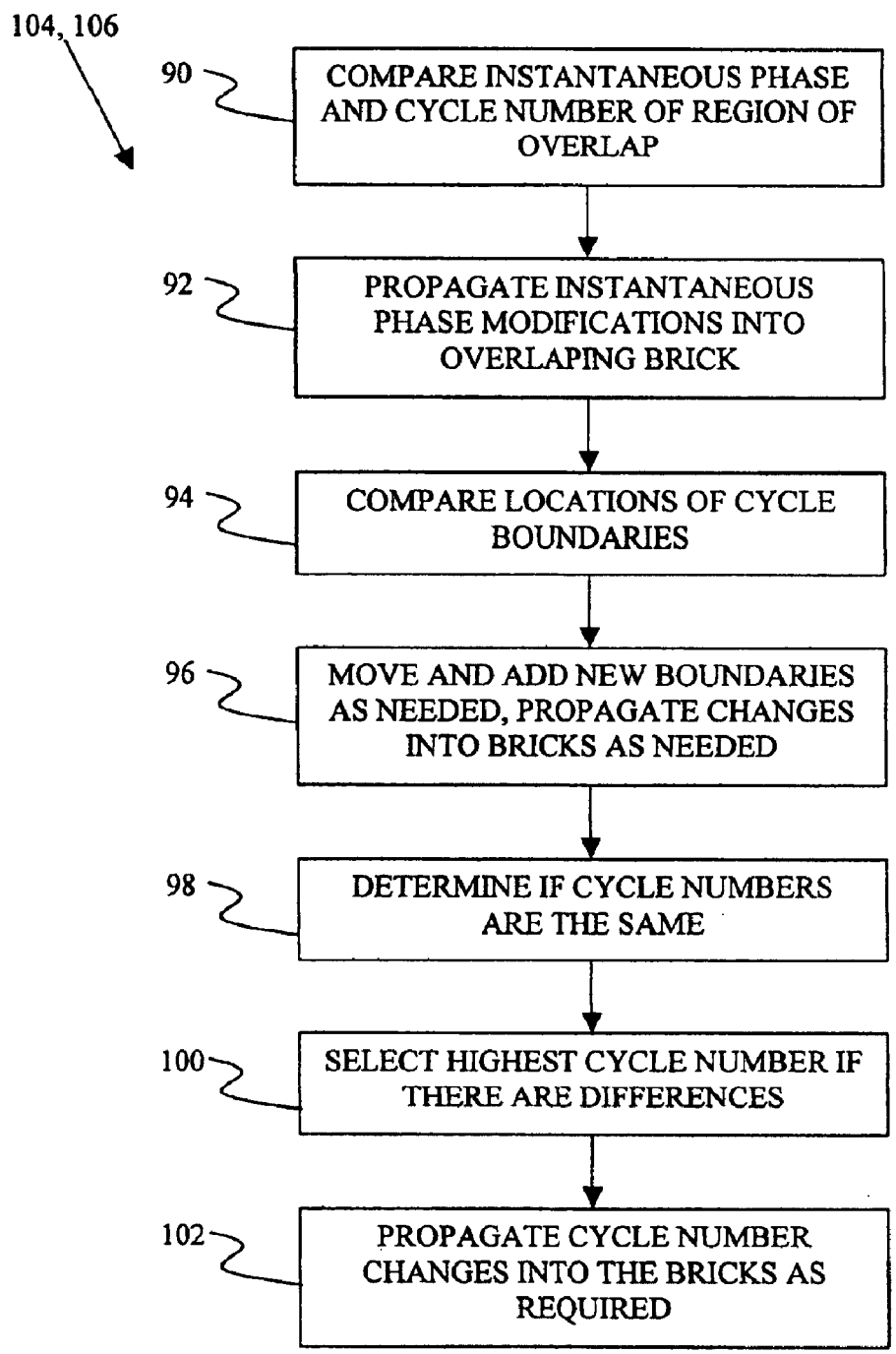
FIG. 13 is another flow chart of an embodiment of the invention for large data volumes.

Use of the overlapping brick method outlined in FIGS. 12 and 13 will typically afford greater efficiency in utilization of available computer memory. Most all routines will work significantly faster if all of the data required in the calculations can be placed in a computer's random access memory (RAM) at one time. Therefore, the optimum brick size may be determined on the basis of RAM capacity of the computer utilized for performing the computations and the memory requirements of the particular algorithm utilized.

In the area of brick overlap, there will normally be two sets of values available, the instantaneous phase values and the cycle values. Normally there will be no difference between the instantaneous phase values in the area of overlap. However, in order to improve the unwrapping results, the instantaneous phase may have been modified slightly in one of the overlapping regions, and, in such case, the modification will normally be propagated, in step 92, into the other overlapping brick. The geologic time volume will then need to be adjusted or recalculated in this brick to take into account the modified instantaneous phase.

A set of steps for comparing the overlap regions are outlined in FIG. 13. In step 90, the instantaneous phase and cycle numbers are compared in the region of overlap. Unless some values have been changed slightly, the instantaneous phase values will be identical. As stated above, in order to improve the unwrapping results, the instantaneous phase might have been modified slightly in one of the overlapping regions, and, in such case, in step 92, instantaneous phase modifications are propagated into the overlapping brick, and the geologic time recalculated if required. In step 94, locations of cycle boundaries are compared. In step 96 of FIG. 13, cycle boundaries are moved, if necessary, so that they are aligned, and new boundaries are added, as needed, and changes are propagated into the bricks as needed. In step 98 it is determined if the cycle numbers are the same in the overlapping bricks. In step 100, the highest cycle number is selected if there are differences. In step 102, cycle number changes, if any, are propagated into the overlapping bricks.

Figure 14:
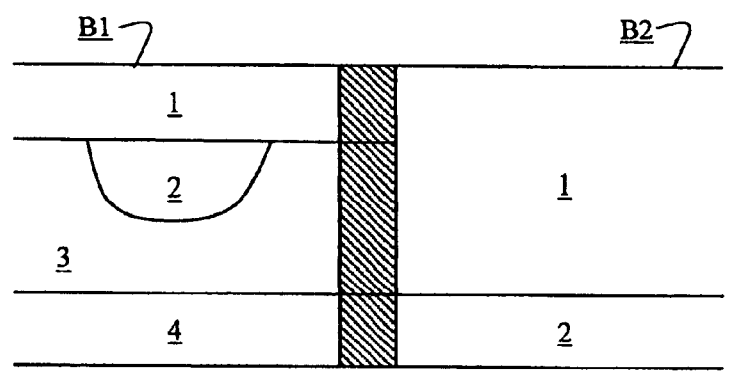
FIG. 14 illustrates the reconciliation of adjoining bricks for large data volumes.
Figure 15:
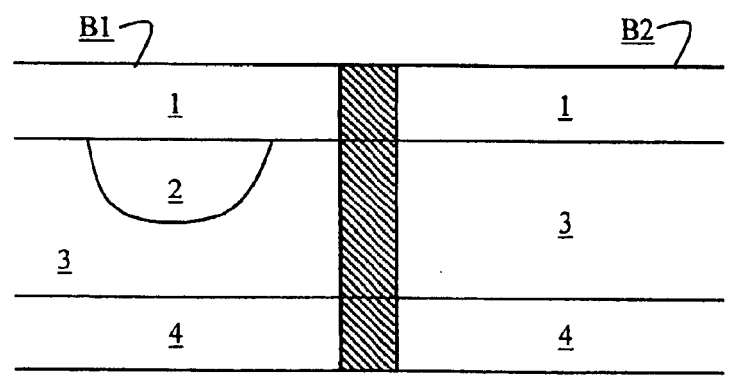
FIG. 15 illustrates the reconciliation of adjoining bricks for large data volumes.

In comparing the cycle boundaries in the area of brick overlap (step 94), at times these boundaries will not be at the same location. FIGS. 14 and 15 provide examples of this situation. The crosshatched regions of FIGS. 14 and 15 are the overlapped regions. FIG. 14 shows two bricks prior to being reconciled. Brick B1 has three cycles over the same interval where Brick B2 has only one cycle. In this case the boundary in brick B1 between cycle 1 and cycle 3 is most likely not where the phase changes from +180 degrees to −180 degrees. This boundary may be following a value of constant phase, or a small jump in the instantaneous phase values. In order to reconcile these two bricks, an additional cycle boundary may be inserted into brick B2, thus splitting cycle 1 into two cycles. This boundary must extend throughout the brick, or logically intersect another cycle boundary. The new cycle in the lower half of brick B2 will be set to the value of cycle 3 to agree with the corresponding cycle in brick B1. All other cycles in brick B2 below this cycle will be incremented by the difference in the cycle value of cycle 3 in brick B1 and cycle 1 in brick B2. Brick B2 will not contain a cycle value of 2. FIG. 15 shows the two bricks after being reconciled.

Certain information may be useful for reconciling the geologic time values of the different bricks as outlined in FIG. 13. The following lists contain values that may be calculated and stored for each brick, for each face of each brick, and for each cycle included in each brick.

Values calculated and stored for each brick:
(a) Total number of cycles in brick
(b) Minimum cycle number in brick
(c) Maximum cycle number in brick
(d) List of all cycle numbers used
(e) List of all cycles whose top is potentially an unconformity
(f) List of all cycles whose base is potentially an unconformity Values calculated and stored for each face of each brick:
(a) Minimum cycle number on face
(b) Maximum cycle number on face
(c) Number of samples of overlap
(d) Reconciliation flag—has this face been reconciled with an adjoining face?

Values calculated and stored for each cycle included in each brick:
(a) Minimum instantaneous phase at top of cycle
(b) Maximum instantaneous phase at top of cycle
(c) Minimum instantaneous phase at bottom of cycle (d) Maximum instantaneous phase at bottom of cycle (e) Minimum value (cycle number) of next shallower cycle (f) Maximum value (cycle number) of next shallower cycle (g) Minimum value (cycle number) of next deeper cycle (h) Maximum value (cycle number) of next deeper cycle (i) Potential unconformity flag The values stored for each cycle in a brick are used primarily to determine if the potential unconformity flag should be set for that cycle. The potential unconformity flag should be set under the following conditions:

If there is a large variation between the minimum instantaneous phase number at the top of a cycle and the maximum instantaneous phase at the top of a cycle, or if these phase numbers are not close to −180 degrees.

If there is a large variation between the minimum instantaneous phase number at the bottom of a cycle and the maximum instantaneous phase number at the bottom of a cycle, or if these phase numbers are not close to +180 degrees, or If the minimum value (cycle number) of the next shallower cycle and the maximum value (cycle number) of the next shallower cycle are not the same number, or If the minimum value (cycle number) of the next deeper cycle and the maximum value (cycle number) of the next deeper cycle are not the same number.

An unconformity flag which is set could be either a true or false flag, or have values that distinguish between the different conditions under which an unconformity flag is set.

The number of samples of overlap (item c) and the reconciliation flag (item d) for each face of the brick may be the most important values stored for a brick. The number of samples of overlap may be the same for all faces of all bricks, and therefore this number may need to be saved in only one location. The number of samples of overlap is required to determine if the values (cycle numbers) agree in the brick overlap regions. To generate a consistent geologic time volume, it is important to reconcile all of the faces (overlap regions) of all of the bricks. When the cycle numbers are modified on a face of a brick, this change probably will require the cycle numbers to be changed throughout the brick and therefore on other faces of the brick. Accordingly, if the cycle numbers are modified on any other brick faces, then the reconciliation flag of those faces need to be set to false. For a face to be reconciled, the reconciliation flag for adjoining faces need to be true. The reconciliation flag could be a single 8 bit word, and different bits of the word used to represent different faces of the brick.

For reconciliation purposes the total number of cycles and the minimum and maximum cycle numbers and the list of cycle values used can be used to build an input-output table for reassigning cycle numbers to the individual bricks. The list of potential unconformities are used to help determine which cycle number to modify when there is a choice between one or more cycles to modify in order to get two bricks to reconcile.

In addition to their use for reconciliation purposes, the values (cycle numbers) contained in the brick can be used in determining if a particular geologic time is present in a brick. The minimum and maximum cycle number for each face may be used in a test to determine if a particular cycle number does not intersect the face. If a particular geologic time does not fall within the geologic times corresponding to the minimum and maximum cycle numbers of the brick, then the particular geologic time is not in the brick.

Once a pseudo geologic time volume has been generated, available data may be utilized to calibrate the geologic time volume to "measured" geologic time. Geologic time is determined from rock samples from wellbores (including core samples and drill cuttings), well log data and other data sources, from which paleontological data, radioisotope data, and other data may be derived, as well as charts of the rise and fall of sea levels and other data known to those of ordinary skill in the art. In order to calibrate the pseudo geologic time volume, the seismic data signal travel time needs to be tied to the geologic time data. Once this tie is made, a table or function may then be generated that relates the pseudo geologic time at a location to the measured geologic time for that location. This table or function may then be applied to the entire geologic time volume to generate a calibrated geologic time volume.

Because of the possibilities of inconsistencies in the input data used for calibrating the geologic time volume, inconsistent results may be produced in the geologic time volume. Accordingly, once a geologic time volume has been created, by whatever embodiment of the invention, it may be useful to search the geologic time volume for locations where the geologic time is decreasing with increasing depth. This can be done by searching for locations where the first derivative of geologic time is decreasing in the vertical direction in the geologic time volume. In locations of reverse or thrust faults or overturned beds, geologic time may decreases with increasing depth, but most situations where geologic time decreases with increasing depth will indicate an error in the data.

For locations where the available seismic data quality is not of sufficient quality to obtain a good estimate of geologic time a representation of either an unknown time or a potential time range may be utilized in the geologic time volume.

In one implementation of the invention, a representation of geologic time is generated for each data point in a 3D seismic survey. In this implementation the geologic time volume will have the same spatial dimensions as the seismic data volume of interest. It is understood that the region of interest may be a portion of a larger 3D seismic data volume. Each x, y and z data point in the seismic data volume of interest (where x and y represent spatial dimensions such as the in-line and cross line directions and z represents either travel time or depth) will have a corresponding point in the geologic time volume. Whereas in the seismic data volume the value (or representation) of a data point is reflection amplitude (or other measured or calculated seismic attribute value), in the geologic time volume the value (or representation) of a data point will be related to geologic time. The representation of geologic time for this corresponding point could be either a single value (of either pseudo or true geologic time), or a combination of two or more values. For example, the geologic time could be broken into low and high frequency components (e.g. cycle number and instantaneous phase). Furthermore, the pseudo geologic time could be represented by a single or multiple values, and then another representation (possibly a bias and scalar) could be used to calibrate the pseudo geologic time to a measured geologic time value. In such a representation each seismic sample could have four values to represent the actual geologic time at that sample point.

The size of a 3D seismic survey of interest may vary over several orders of magnitude. 3D surveys collected onshore in the United States may only have 100 in-lines, 200 cross lines and 1000 data samples. The size of 3D surveys collected offshore are normally much larger. There are many surveys that have over 2000 in-lines and 2000 cross lines and 3000 data samples in each trace. The size of 3D surveys is continuing to grow. While a large survey in 1980 might have contained only 1 gigabyte of data, a large survey in the year 2001 may contain 60 gigabytes.

Accordingly, because of the potentially large size of the seismic data volumes and therefore the geologic time volumes, the invention may be implemented utilizing additional steps of applying data compression techniques to the geologic time data. The applied techniques will need to be applied in a manner to enable geologic times corresponding to specific seismic data sample points to be retrieved from said data storage locations.

In one implementation of the invention, the geologic time volume is generated utilizing low frequency and high frequency components for representing geologic time. The low frequency component may be represented by the cycle number and the high frequency component represented by the instantaneous phase. The low frequency and the high frequency component may then be saved as compressed data, or as either 8 or 16 bit volumes, or some word size that is smaller than the floating point word size used to store the seismic data. Eight bit words may have enough resolution for the instantaneous phase. The cycle number word size should be big enough to hold the largest cycle number.

The cycle numbers may also be reused so the cycle values wrap (repeat), so that the cycle values may be stored using a small computer word (e.g., 8 or 16 bit numbers). The surface between cycles at which the cycle numbers begin to repeat is referred to herein as a "wrap surface". The wrap surfaces, including the spatial position of the wrap surface and the number of times the cycle values have wrapped, may be stored to assist in unwrapping the unwrapped cycle values. The unique cycle number of a point may then be determined from its wrapped cycle number and the number of times the cycle values have wrapped. The number of times the cycle values have wrapped may be determined from either the wrap surface above or below the current point. The instantaneous phase is then used to complete the geologic time determination.

The number of times the cycle values have wrapped may also be determined, without storing the number of times the cycles numbers have wrapped, by determining the number of locations within the geologic time volume above the location of interest at which the first derivative of the unwrapped cycle number is negative. Each time the cycle number "wraps", the stored cycle number will revert to "0", thereby yielding such a negative derivative.

In another implementation of the invention, just the cycle values are saved in a geologic time volume and the instantaneous phase is not saved The instantaneous phase values may be calculated from the seismic data as needed to find a more exact geologic time.

In another implementation of the invention, geologic time may be discretized to peaks, troughs and zero-crossings, which provides data for 64 cycle numbers per 8 bit word, or data for over 16,000 cycle numbers per 16 bit word. If desired these peaks, troughs and zero-crossings values may be wrapped as described above with reference to cycle numbers.

Those of ordinary skill in the art will understand that other compression and uncompression techniques may be selected on the basis of the amount of compression obtainable, the amount and type of information loss due to the compression routine, the calculation time required to perform the compression, and the calculation time required to uncompress the data.

The availability of a geologic time volume during the seismic data interpretation process may result in a more detailed, complete and internally consistent interpretation. Further, generating a geologic time volume from existing interpretations may indicate errors in those interpretations where the implied geologic time decreases with depth (travel time) in areas where thrust faulting and overturned beds are not expected. Anomalous changes in geologic time versus travel time may also indicate interpretation problems or unique depositional or compaction environments.

Figure 16:
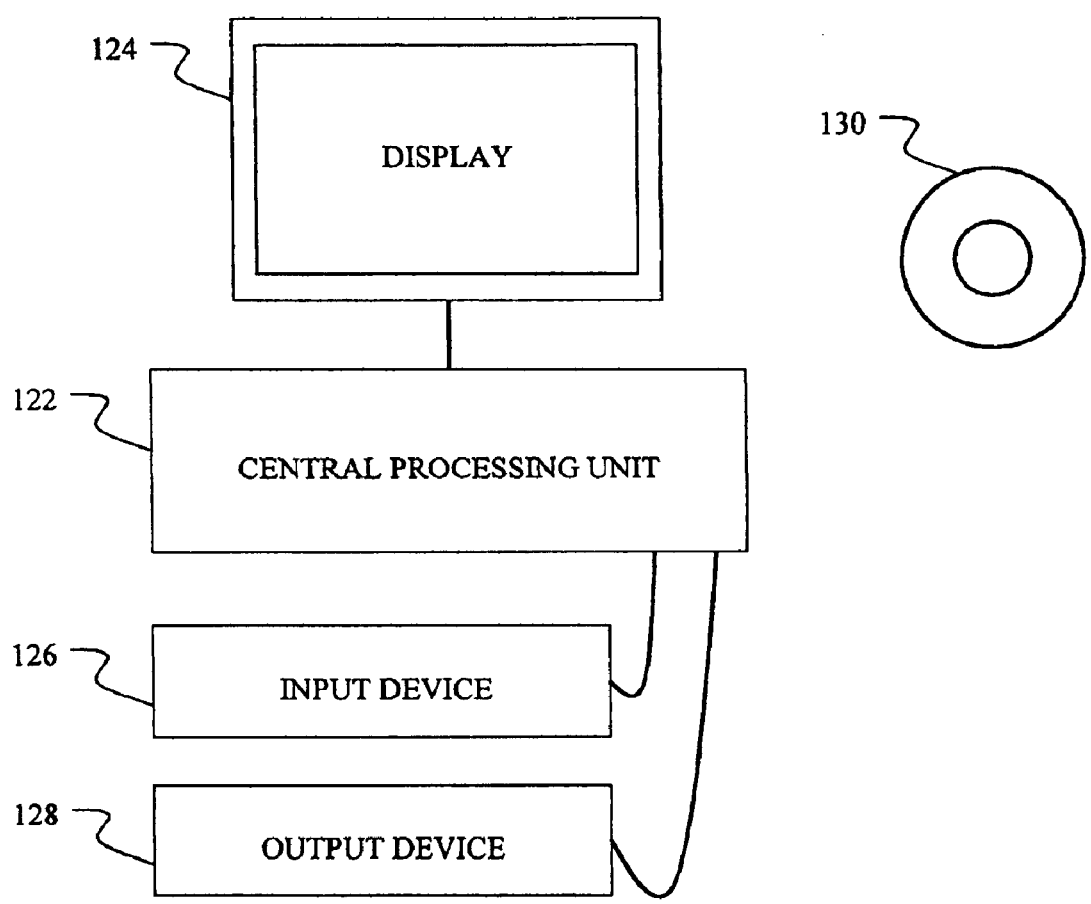
FIG. 16 shows a computer system for carrying out the invention.

The process of the invention disclosed herein is most conveniently carried out by writing a computer program to carry out the steps described herein on a work station or other conventional digital computer system of a type normally used in the industry. The generation of such a program may be performed by those of ordinary skill in the art based on the processes described herein. FIG. 16 shows such a conventional computer system comprising a central processing unit 122, a display 124, an input device 126, and a output device 128. The computer program for carrying out the invention will normally reside on a storage media (not shown) associated with the central processing unit. Such computer program may be transported on a CD-ROM, a magnetic tape or magnetic disk, an optical disk, or other storage media, shown symbolically as storage medium 130.

The results of the calculations according this invention may be displayed with commercially available visualization software. Such software is well known to those of ordinary skill in the art and will not be further described herein. It should be appreciated that the results of the methods of the invention can be displayed, plotted or both.

While the invention has been described and illustrated herein by reference to certain preferred embodiments in relation to the drawings attached hereto, various changes and further modifications, apart from those shown or suggested herein, may be made herein by those skilled in the art, without departing from the spirit of the invention, the scope of which is defined by the following claims.

I claim:

1. A method for analyzing seismic data, comprising:
   selecting a seismic data volume from a subsurface region of interest, said seismic data volume comprising seismic data sample points;
   declaring a geologic time volume having data storage locations corresponding to substantially each of said seismic data sample points in said selected seismic data volume;
   obtaining a geologic time for substantially each seismic data sample point in said selected seismic data volume; and
   storing said obtained geologic times in said geologic time volume in data storage locations corresponding to substantially each seismic data sample point for which said geologic times were obtained.

2. The method of claim 1 wherein said geologic times comprise estimated geologic times.

3. The method of claim 1 wherein said geologic times comprise pseudo geologic times.

4. The method of claim 2 wherein said estimated geologic times are obtained from available data for locations within said subsurface region of interest.

5. The method of claim 1 wherein said seismic data volume is a three dimensional seismic data volume.

6. The method of claim 1 wherein said seismic data volume is a two-dimensional seismic data volume.

7. The method of claim 1 wherein storing said geologic times comprises storing said geologic times on a magnetic storage medium.

8. The method of claim 1 wherein storing said geologic times comprises storing said geologic times on an optical storage medium.

9. The method of claim 1 wherein storing said geologic times comprises storing said geologic times on a computer random access memory.

10. The method of claim 4 wherein said available data comprise data from at least one wellbore.

11. The method of claim 10 wherein said data from at least one wellbore comprise measurements made on rock samples from a wellbore.

12. The method of claim 4 further comprising interpolating geologic times for locations within said seismic data volume between locations for which geologic time data are available.

13. The method of claim 12 wherein interpolation of geologic times for locations within said seismic data volume between locations for which geologic time data are available comprises unwrapping instantaneous phase of seismic data.

14. The method of claim 1 wherein said geologic times are obtained from horizons which have been identified in said seismic data volume.

15. The method of claim 14 wherein all seismic data sample points corresponding to at least one of said horizons are assigned the same geologic time.

16. The method of claim 14 wherein a pseudo geologic time is assigned to each said identified horizon.

17. The method of claim 14 wherein an estimated geologic time is assigned to at least one identified horizon on the basis of available geologic time data.

18. The method of claim 14 further comprising interpolating geologic time between locations of identified horizons.

19. The method of claim 18 wherein said interpolation comprises unwrapping instantaneous phase of seismic data.

20. The method of claim 3 wherein obtaining estimated geologic times comprises unwrapping instantaneous phase of seismic data.

21. A method for analyzing seismic data, comprising:
selecting a seismic data volume from a subsurface region of interest, said seismic data volume comprising seismic data sample points;
declaring a geologic time volume having data storage locations corresponding to substantially each of said seismic data sample points in said selected seismic data volume;
selecting a plurality of identified horizons from said seismic data volume;
assigning a geologic time to each said identified horizon;
storing said geologic time assigned to each said identified horizon in storage locations in said geologic time volume corresponding to locations of said identified horizons in said seismic data volume; and
obtaining a geologic time for substantially each storage location in said geologic time volume for which a geologic time for an identified horizons has not been assigned, and storing said obtained geologic times in said storage locations for which a geologic time for an identified horizon has not been assigned, thereby generating a geologic time volume.

22. The method of claim 21 wherein all seismic data sample points corresponding to at least one of said horizons are assigned the same geologic time.

23. The method of claim 21 wherein a pseudo geologic time is assigned to each said identified horizon.

24. The method of claim 21 wherein at least one of said identified horizons is an unconformity and said assigned geologic time varies laterally along said horizon.

25. The method of claim 21 wherein estimated geologic time is assigned to at least one identified horizon on the basis of available geologic time data.

26. The method of claim 21 wherein obtaining a geologic time for substantially each storage location in said geologic time volume for which a geologic time of said identified horizons has not been assigned comprises interpolating geologic time between locations of identified horizons.

27. The method of claim 26 wherein said interpolation comprises unwrapping instantaneous phase of seismic data.

28. A method for analyzing seismic data, comprising:
selecting a seismic data volume comprising spatially related seismic data traces, each seismic data trace comprising seismic data sample points;
calculating instantaneous phase for a plurality of said seismic data traces;
unwrapping the calculated instantaneous phase for said plurality of seismic data traces;
assigning geologic times to locations along said seismic data traces, said geologic times being related to unwrapped phase at said locations; and
storing said assigned geologic times in selected storage locations corresponding to said locations along said seismic data traces, thereby generating a geologic time volume.

29. The method of claim 28 wherein unwrapping instantaneous phase of a seismic data trace comprises:
(a) determining cycle numbers for said seismic data traces; and
(b) determining unwrapped phase for said seismic data traces, said unwrapped phase and cycle numbers being related to instantaneous phase according to the following relationship:

$$\phi = IP + 360n$$

where:
$\phi$=unwrapped phase (in degrees);
IP=instantaneous phase (in degrees); and
n=cycle number.

30. The method of claim 28 further comprising determining locations in the unwrapped instantaneous phase where the change in unwrapped phase is anomalous.

31. The method of claim 30 wherein at least one of said locations is the location of an unconformity.

32. The method of claim 30 wherein at least one of said locations is the location of a fault.

33. The method of claim 30 wherein at least one of said locations is the location of a fluid contact.

34. The method of claim 30 wherein at least one of said locations is the location of source generated noise interference.

35. The method of claim 30 wherein at least one of said locations is the location of a phase unwrapping error.

36. The method of claim 28 further comprising applying a constraint to the instantaneous phase unwrapping to limit the number of successive sample times of a seismic data trace fur which the first derivative of the unwrapped instantaneous phase may be negative.

37. The method of claim 36 wherein the constraint includes verifying that the instantaneous phase was generated so that it increases with seismic signal travel time.

38. The method of claim 36 wherein the constraint includes determining locations where the derivative of the instantaneous phase is negative for at least two vertically consecutive sample points and minimizing the effect of said locations on phase unwrapping results.

39. The method of claim 28 further comprising applying a constraint to the instantaneous phase unwrapping which utilizes disturbances in the local continuity of the instantaneous phase to determine the best location for branch cuts used by a phase unwrapping algorithm.

40. The method of claim 28 further comprising applying a constraint to the instantaneous phase unwrapping which utilizes disturbances in the local continuity of the instantaneous phase to determine low quality zones used by a phase unwrapping algorithm.

41. A method for analyzing seismic data, comprising:
   selecting a seismic data volume comprising seismic data sample points;
   selecting a plurality of adjoining subvolumes from said seismic data volume;
   for each subvolume, obtaining geologic times corresponding to at least a portion of said seismic data sample points;
   reconciling geologic times corresponding to seismic data sample points in adjoining locations of said subvolumes; and
   for each subvolume, storing said reconciled geologic times in data storage locations corresponding to said at least a portion of said seismic data sample points; thereby generating a geologic time volume for each subvolume.

42. The method of claim 41 wherein said adjoining subvolumes are contiguous subvolumes.

43. The method of claim 41 wherein said adjoining subvolumes are overlapping subvolumes.

44. The method of claim 41 wherein reconciling geologic times corresponding to seismic data sample points in adjoining locations of said subvolumes further comprises:
   comparing instantaneous phase and cycle numbers in said adjoining locations;
   propagating instantaneous phase modifications into adjoining subvolumes;
   comparing locations of cycle boundaries in said adjoining locations;
   moving and adding new boundaries into adjoining subvolumes;
   determining if cycle numbers are the same in said adjoining locations;
   selecting the highest cycle number if cycle numbers are different at said adjoining locations; and
   propagating any changes in cycle numbers into adjoining subvolumes.

45. A method for analyzing seismic data, comprising:
   selecting a seismic data volume comprising seismic data sample points;
   selecting a plurality of adjoining subvolumes from said seismic data volume;
   for each subvolume, obtaining geologic times corresponding to at least a portion of said seismic data sample points;
   reconciling geologic times corresponding to seismic data sample points in adjoining locations of said subvolumes; and
   storing said reconciled geologic times in data storage locations corresponding to said selected seismic data volume; thereby generating a geologic time volume.

46. The method of claim 45 wherein reconciled geologic times from each of said plurality of adjoining subvolumes are stored in a single geologic time volume.

47. The method of claim 45 wherein said adjoining subvolumes are contiguous subvolumes.

48. The method of claim 45 wherein said adjoining subvolumes are overlapping subvolumes.

49. The method of claim 45 wherein reconciling geologic times corresponding to seismic data sample points in adjoining locations of said subvolumes further comprises:
   comparing instantaneous phase and cycle numbers in said adjoining locations;
   propagating instantaneous phase modifications into adjoining subvolumes;
   comparing locations of cycle boundaries in said adjoining locations;
   moving and adding new boundaries into adjoining subvolumes;
   determining if cycle numbers are the same in said adjoining locations;
   selecting the highest cycle number if cycle numbers are different at said adjoining locations; and
   propagating any changes in cycle numbers into adjoining subvolumes.

50. A method for analyzing seismic data, comprising:
   selecting a seismic data volume comprising seismic data sample points;
   declaring a geologic time volume having data storage locations corresponding to substantially each said seismic data sample point in said selected seismic data volume;
   obtaining a geologic time for substantially each seismic data sample point in said selected seismic data volume, thereby generating assembled geologic time data;
   applying data compression techniques to said assembled geologic time data, thereby generating compressed geologic time data; and
   storing said compressed geologic time data in said data storage locations to enable geologic times corresponding to substantially each said seismic data sample points for which said geologic times were determined to be retrieved from said data storage locations.

51. The method of claim 50 wherein representations of geologic time are stored in said geologic time volume as a single value.

52. The method of claim 50 wherein representations of geologic time are stored in said geologic time volume as a combination of at least two values.

53. The method of claim 52 wherein said at least two values comprise cycle number and instantaneous phase.

54. The method of claim 53 wherein cycle numbers are repeated to create wrapped cycle numbers.

55. The method of claim 54 wherein cycle number wrap surfaces are stored so that the spatial position of the cycle number wrap surface and the number of times the cycle values have wrapped are stored.

56. The method of claim 54 further comprising determining the unwrapped cycle number of a point from the wrapped cycle number and the number of times the cycle values have wrapped.

57. The method of claim 1 wherein representations of pseudo geologic time are stored in said geologic time volume and other representations are stored in said geologic time volume to calibrate the pseudo geologic time to measured geologic time.

58. A digital computer programmed to utilize seismic data to perform a process comprising the steps of:
   selecting a seismic data volume from a subsurface region of interest, said seismic data volume comprising seismic data sample points;

declaring a geologic time volume having data storage locations corresponding to substantially each of said seismic data sample points in said selected seismic data volume;

obtaining a geologic time for substantially each seismic data sample point in said selected seismic data volume; and storing said obtained geologic times in said geologic time volume in data storage locations corresponding to substantially each seismic data sample point for which said geologic times were obtained.

59. A device which is readable by a digital computer having instructions defining the following process and instructions to the computer to perform said process:

selecting a seismic data volume from a subsurface region of interest, said seismic data volume comprising seismic data sample points;

declaring a geologic time volume having data storage locations corresponding to substantially each of said seismic data sample points in said selected seismic data volume;

obtaining a geologic time for substantially each seismic data sample point in said selected seismic data volume; and storing said obtained geologic times in said geologic time volume in data storage locations corresponding to substantially each seismic data sample points for which said geologic times were obtained.

60. A digital computer programmed to utilize seismic data to perform a process comprising the steps of:

selecting a seismic data volume from a subsurface region of interest, said seismic data volume comprising seismic data sample points;

declaring a geologic time volume having data storage locations corresponding to substantially each of said seismic data sample points in said selected seismic data volume;

selecting a plurality of identified horizons from said seismic data volume;

assigning a geologic time to each said identified horizon;

storing said geologic time assigned to each said identified horizon in storage locations in said geologic time volume corresponding to locations of said identified horizons in said seismic data volume; and obtaining a geologic time for substantially each storage location in said geologic time volume for which a geologic time for an identified horizons has not been assigned, and storing said obtained geologic times in said storage locations for which a geologic time for an identified horizon has not been assigned, thereby generating a geologic time volume.

61. A device which is readable by a digital computer having instructions defining the following process and instructions to the computer to perform said process:

selecting a seismic data volume from a subsurface region of interest, said seismic data volume comprising seismic data sample points;

declaring a geologic time volume having data storage locations corresponding to substantially each of said seismic data sample points in said selected seismic data volume;

selecting a plurality of identified horizons from said seismic data volume;

assigning a geologic time to each said identified horizon;

storing said geologic time assigned to each said identified horizon in storage locations in said geologic time volume corresponding to locations of said identified horizons in said seismic data volume; and obtaining a geologic time for substantially each storage location in said geologic time volume for which a geologic time for an identified horizons has not been assigned, and storing said obtained geologic times in said storage locations for which a geologic time for an identified horizon has not been assigned, thereby generating a geologic time volume.

62. A digital computer programmed to utilize seismic data to perform a process comprising the steps of:

selecting a seismic data volume comprising spatially related seismic data traces, each seismic data trace comprising seismic data sample points;

calculating instantaneous phase for a plurality of said seismic data traces;

unwrapping the calculated instantaneous phase for said plurality of seismic data traces;

assigning geologic times to locations along said seismic data traces, said geologic times being related to unwrapped phase at said locations; and storing said assigned geologic times in selected storage locations corresponding to said locations along said seismic data traces, thereby generating a geologic time volume.

63. A device which is readable by a digital computer having instructions defining the following process and instructions to the computer to perform said process:

selecting a seismic data volume comprising spatially related seismic data traces, each seismic data trace comprising seismic data sample points;

calculating instantaneous phase for a plurality of said seismic data traces;

unwrapping the calculated instantaneous phase for said plurality of seismic data traces;

assigning geologic times to locations along said seismic data traces, said geologic times being related to unwrapped phase at said locations; and storing said assigned geologic times in selected storage locations corresponding to said locations along said seismic data traces, thereby generating a geologic time volume.

* * * * *